United States Patent
Short et al.

(10) Patent No.: US 9,160,674 B2
(45) Date of Patent: *Oct. 13, 2015

(54) SYSTEMS AND METHODS FOR DYNAMIC DATA TRANSFER MANAGEMENT ON A PER SUBSCRIBER BASIS IN A COMMUNICATIONS NETWORK

(71) Applicant: NOMADIX, INC., Agoura Hills, CA (US)

(72) Inventors: Joel E. Short, Los Angeles, CA (US); Frederic Delley, Redwood City, CA (US); Mark F. Logan, Santa Monica, CA (US); Daniel Toomey, Moorpark, CA (US)

(73) Assignee: NOMADIX, INC., Agoura Hills, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/146,971

(22) Filed: Jan. 3, 2014

(65) Prior Publication Data

US 2014/0215089 A1 Jul. 31, 2014

Related U.S. Application Data

(63) Continuation of application No. 13/094,769, filed on Apr. 26, 2011, now Pat. No. 8,626,922, which is a continuation of application No. 12/771,915, filed on Apr. 30, 2010, now Pat. No. 7,953,857, which is a (Continued)

(51) Int. Cl.
*G06F 15/173* (2006.01)
*H04L 12/823* (2013.01)

(Continued)

(52) U.S. Cl.
CPC ............... *H04L 47/32* (2013.01); *H04L 12/14* (2013.01); *H04L 12/1403* (2013.01);
(Continued)

(58) Field of Classification Search
USPC ........... 709/226, 227, 232, 240; 370/348, 352
See application file for complete search history.

(56) References Cited

U.S. PATENT DOCUMENTS

| 5,113,499 A | 5/1992 | Ankney et al. |
| 5,446,735 A | 8/1995 | Tobagi et al. |

(Continued)

FOREIGN PATENT DOCUMENTS

| EP | 0 742 657 | 5/1996 |
| EP | 0 767 595 A | 4/1997 |

(Continued)

OTHER PUBLICATIONS

Complaint for Patent Infringement of U.S. Pat. Nos. 6,130,892; 7,088,727; 6,636,894; 6,868,399; 6,789,110 and 7,554,995, dated Nov. 17, 2009.

(Continued)

*Primary Examiner* — Liangche A Wang
(74) *Attorney, Agent, or Firm* — Knobbe Martens Olson & Bear, LLP

(57) ABSTRACT

A method of dynamically managing transmission of packets is disclosed. The method, in some embodiments, may comprise establishing a network session over a communication link between a network and a user device of a user and associating a data transmission parameter with the user device. The method may further comprise receiving a packet and calculating a delay period associated with the packet based on the data transmission parameter and delaying transmission of the packet based on the delay period.

18 Claims, 8 Drawing Sheets

Related U.S. Application Data continuation of application No. 09/693,481, filed on Oct. 20, 2000, now Pat. No. 7,739,383.

(60) Provisional application No. 60/161,182, filed on Oct. 22, 1999.

(51) Int. Cl.

| | | |
|---|---|---|
| *H04L 12/14* | (2006.01) | |
| *H04L 12/26* | (2006.01) | |
| *H04L 12/54* | (2013.01) | |
| *H04L 29/06* | (2006.01) | |
| *H04L 12/24* | (2006.01) | |
| *H04L 12/801* | (2013.01) | |
| *H04L 12/813* | (2013.01) | |
| *H04L 12/835* | (2013.01) | |
| *H04L 12/919* | (2013.01) | |
| *H04L 12/927* | (2013.01) | |
| *H04L 12/911* | (2013.01) | |
| *H04L 29/08* | (2006.01) | |

(52) U.S. Cl.
CPC ....... *H04L 12/1439* (2013.01); *H04L 12/2602* (2013.01); *H04L 12/5695* (2013.01); *H04L 29/06* (2013.01); *H04L 41/0809* (2013.01); *H04L 41/0886* (2013.01); *H04L 41/0896* (2013.01); *H04L 43/00* (2013.01); *H04L 47/10* (2013.01); *H04L 47/14* (2013.01); *H04L 47/15* (2013.01); *H04L 47/20* (2013.01); *H04L 47/30* (2013.01); *H04L 47/765* (2013.01); *H04L 47/808* (2013.01); *H04L 47/824* (2013.01); *H04L 63/0892* (2013.01); *H04L 67/02* (2013.01); *H04L 67/12* (2013.01); *H04L 67/306* (2013.01); *H04L 69/329* (2013.01); *H04L 41/5019* (2013.01); *H04L 43/0894* (2013.01); *H04L 63/10* (2013.01)

(56) References Cited

U.S. PATENT DOCUMENTS

| | | | |
|---|---|---|---|
| 5,475,740 | A | 12/1995 | Biggs, Jr. et al. |
| 5,608,446 | A | 3/1997 | Carr et al. |
| 5,708,654 | A | 1/1998 | Arndt et al. |
| 5,708,780 | A | 1/1998 | Levergood et al. |
| 5,732,078 | A | 3/1998 | Arango |
| 5,751,956 | A | 5/1998 | Kirsch |
| 5,787,483 | A | 7/1998 | Jam et al. |
| 5,793,978 | A * | 8/1998 | Fowler .......................... 709/226 |
| 5,799,002 | A | 8/1998 | Krishnan |
| 5,802,310 | A | 9/1998 | Rajaraman |
| 5,915,087 | A | 6/1999 | Hammond et al. |
| 5,978,387 | A * | 11/1999 | Sherman ...................... 370/468 |
| 5,987,430 | A | 11/1999 | Horne et al. |
| 6,006,264 | A | 12/1999 | Colby et al. |
| 6,035,405 | A | 3/2000 | Gage et al. |
| 6,078,953 | A | 6/2000 | Vaid et al. |
| 6,128,601 | A | 10/2000 | Horne et al. |
| 6,130,892 | A | 10/2000 | Short et al. |
| 6,151,598 | A * | 11/2000 | Shaw et al. ........................ 1/1 |
| 6,170,012 | B1 | 1/2001 | Coss et al. |
| 6,194,992 | B1 | 2/2001 | Short et al. |
| 6,226,677 | B1 | 5/2001 | Slemmer |
| 6,232,764 | B1 | 5/2001 | Rettig et al. |
| 6,256,674 | B1 | 7/2001 | Manning et al. |
| 6,286,045 | B1 | 9/2001 | Griffiths et al. |
| 6,286,046 | B1 | 9/2001 | Bryant |
| 6,307,836 | B1 | 10/2001 | Jones et al. |
| 6,310,886 | B1 | 10/2001 | Barton |
| 6,460,084 | B1 | 10/2002 | Horne et al. |
| 6,567,857 | B1 | 5/2003 | Gupta et al. |
| 6,587,127 | B1 * | 7/2003 | Leeke et al. .................. 715/765 |
| 6,604,087 | B1 | 8/2003 | Kolls |
| 6,609,153 | B1 | 8/2003 | Salkewicz |
| 6,618,355 | B1 | 9/2003 | Gulliford et al. |
| 6,636,891 | B1 | 10/2003 | LeClair et al. |
| 6,636,894 | B1 | 10/2003 | Short et al. |
| 6,654,808 | B1 | 11/2003 | Chuah |
| 6,735,633 | B1 | 5/2004 | Welch et al. |
| 6,738,371 | B1 | 5/2004 | Ayres |
| 6,789,110 | B1 | 9/2004 | Short et al. |
| 6,795,852 | B1 | 9/2004 | Kleinrock et al. |
| 6,810,426 | B2 | 10/2004 | Mysore et al. |
| 6,826,694 | B1 | 11/2004 | Dutta et al. |
| 6,857,009 | B1 | 2/2005 | Ferreria et al. |
| 6,868,399 | B1 | 3/2005 | Short et al. |
| 7,020,082 | B2 | 3/2006 | Bhagavath et al. |
| 7,088,727 | B1 | 8/2006 | Short et al. |
| 7,117,526 | B1 | 10/2006 | Short et al. |
| 7,194,554 | B1 | 3/2007 | Short et al. |
| 7,197,556 | B1 | 3/2007 | Short et al. |
| 7,216,152 | B2 | 5/2007 | Short et al. |
| 7,233,997 | B1 | 6/2007 | Leveridge et al. |
| 7,554,995 | B2 | 6/2009 | Short et al. |
| 7,698,432 | B2 | 4/2010 | Short et al. |
| 7,739,383 | B1 | 6/2010 | Short et al. |
| 7,953,857 | B2 | 5/2011 | Short et al. |
| 8,626,922 | B2 | 1/2014 | Short et al. |
| 2004/0073704 | A1 | 4/2004 | Paunikar et al. |
| 2006/0239254 | A1 | 10/2006 | Short et al. |
| 2008/0148383 | A1 | 6/2008 | Pitchaikani et al. |
| 2009/0024745 | A1 | 1/2009 | Short et al. |

FOREIGN PATENT DOCUMENTS

| | | |
|---|---|---|
| EP | 0 573 739 A | 12/1997 |
| EP | 0 873 037 A1 | 10/1998 |
| EP | 0 901 301 A | 3/1999 |
| EP | 1 819 108 | 8/2007 |
| EP | 1 855 429 | 11/2007 |
| GB | 2 311 439 | 9/1997 |
| WO | WO 97/02687 | 1/1997 |
| WO | WO 97/22936 A | 6/1997 |
| WO | WO 98/16036 A1 | 4/1998 |
| WO | WO 98/54868 A1 | 12/1998 |
| WO | WO 01/31861 | 5/2001 |

OTHER PUBLICATIONS

Plaintiff Nomadix, Inc.'s Proposed Claim Construction Statement; *Nomadix, Inc.* vs. *Second Rule LLC;* Civil Action CV-07-1946, USDC, CD CA.; May 23, 2008; 183 pages.

*Second Rule LLC's Response to Nomadix, Inc.'s Proposed Claim Construction Statement; Nomadix, Inc.* vs. *Second Rule LLC.;* Civil Action CV-07-1946, USDC, CD CA.; Jun. 6, 2008; 74 pages.

8 Proposed] Joint Claim Construction Statement, *Nomadix, Inc.* vs. *Second Rule LLC;* Civil Action CV-07-1946, USDC, CD CA.; Jul. 2, 2008; 105 pages.

PCT International Search Report dated Mar. 14, 2001 relating to PCT/US2000/029172.

Partial European Search Report; European Patent Application No. EP 07 10 0293; dated Dec. 2, 2009; 4 pgs.

Decision on Appeal mailed Nov. 3, 2009 for U.S. Appl. No. 09/693,481, filed Dec. 20, 2000.

W. Richard Stevens, "TCP/IP Illustrated vol. 1: The Protocols," 1994, 53-62, Addison Wesley.

Andrew S. Tanenbaum, "Computer Nextworks," 1996, 420-42, $3^{rd}$ ed.

Past, present, and future office actions, amendments, arguments, and other relevant documents or materials in the file history of co-pending U.S. Appl. No. 12/771,915, filed Apr. 30, 2010, entitled Systems and Method for Dynamic Data Transfer Management on a Per Subscriber Basis in a Communications Network.

Past, present, and future office actions, amendments, arguments, and other relevant documents or materials in the file history of co-pending U.S. Appl. No. 09/693,481, filed Oct. 20, 2006, entitled Systems and Method for Dynamic Bandwidth Management on a Per Subscriber Basis in a Communications Network.

(56) References Cited

OTHER PUBLICATIONS

Nov. 23, 2009 Office Action in U.S. Appl. No. 09/693,481, filed Oct. 20, 2006.
Dec. 21, 2006 Final Office Action in U.S. Appl. No. 09/693,481, filed Oct. 20, 2006.
Aug. 21, 2006 Office Action in U.S. Appl. No. 09/693,481, filed Oct. 20, 2006.
Mar. 1, 2006 Final Office Action in U.S. Appl. No. 09/693,481, filed Oct. 20, 2006.
May 3, 2005 Office Action in U.S. Appl. No. 09/693,481, filed Oct. 20, 2006.
Sep. 28, 2004 Final Office Action in U.S. Appl. No. 09/693,481, filed Oct. 20, 2006.
Mar. 17, 2004 Office Action in U.S. Appl. No. 09/693,481, filed Oct. 20, 2006.
Past, present, and future office actions, amendments, arguments, and other relevant documents or materials in the file history of co-pending U.S. Appl. No. 12/579,820, filed Oct. 15, 2009, entitled Systems and Method for Dynamic Bandwidth Management on a Per Subscriber Basis in a Communications Network.
Kauser et al., *A Charging Model for Sessions on the Internet*, May 26, 1999, European conference on multimedia applications, services and techniques, v1629, p. 246-261.
Kalkbrenner et al., *Quality of Service (QoS)in Distributed Hypermedia-Systems*, Jul. 1995, IEEE, v10-8186-7180, p. 529-534.
Richards et al., *Mapping User Level QOS form a Single Parameter*, 1998, p. 1-15.
Rupp, et al., "Index: A Platform for Determining How People Value the Quality of Their Internet Access", http://www.INDEX.Berkeley, EDU/reports/98-010P, May 1998.
Nomadix, Inc.'s Amended Answer to iBahn General Holdings Corporation's Complaint and Counterclaims, *Nomdadix, Inc. v. iBahn General Holdings Corporation*, (District of California, Case No. CV11-02604 DDP (VBKx), filed May 2, 2011.
Defendants' Supplemental Joint Invalidity Contentions, *Nomadix, Inc. v. Hewlett-Packard Company, et al.*, Case No. 09-CV-8441 DDP (VBKx) and *Nomadix, Inc. v. Solutionic Technologies Limited*, Case No. 2:10-CV-00381 DDP (VBKx), (Central District of California, Western Division, and dated Jul. 22, 2011.
Appenzeller, et al., "User-Friendly Access Control for Public Network Ports," Department of Computer Science, Stanford University, dated Aug. 31, 1998 in 16 pages.
Anderson, et al., The Magicrouter, an Application of Fast Packet Interposing, dated May 17, 1996 in 12 pages.
Exhibit A, Asserted Claims, filed in Defendants' Supplemental Joint Invalidity Contentions, *Nomadix, Inc. v. Hewlett-Packard Company, et al.*, Case No. 09-CV-8441 DDP (VBKx) and *Nomadix, Inc. v. Solutionic Technologies Limited*, Case No. 2:10-CV-00381 DDP (VBKx), (Central District of California, Western Division, and dated Jul. 22, 2011, in 2 pages.
Exhibit B, Supplemental Prior Art List filed in Defendants' Supplemental Joint Invalidity Contentions, *Nomadix, Inc. v. Hewlett-Packard Company, et al.*, Case No. 09-CV-8441 DDP (VBKx) and *Nomadix, Inc. v. Solutionic Technologies Limited*, Case No. 2:10-CV-00381 DDP (VBKx), (Central District of California, Western Division, and dated Jul. 22, 2011 in 2 pages.
Exhibit C1, Claim Comparison for U.S. Pat. No. 6,130,892 filed in Defendants' Supplemental Joint Invalidity Contentions, *Nomadix, Inc. v. Hewlett-Packard Company, et al.*, Case No. 09-CV-8441 DDP (VBKx) and *Nomadix, Inc. v. Solutionic Technologies Limited*, Case No. 2:10-CV-00381 DDP (VBKx), (Central District of California, Western Division, and dated Jul. 22, 2011 in 4 pages.
Exhibit C2, Claim Comparison for U.S. Pat. No. 7,088,727 filed in Defendants' Supplemental Joint Invalidity Contentions, *Nomadix, Inc. v. Hewlett-Packard Company, et al.*, Case No. 09-CV-8441 DDP (VBKx) and *Nomadix, Inc.v. Solutionic Technologies Limited*, Case No. 2:10-CV-00381 DDP (VBKx), (Central District of California, Western Division, and dated Jul. 22, 2011 in 7 pages.
Exhibit C3, Claim Comparison for U.S. Pat. No. 7,554,995 filed in Defendants' Supplemental Joint Invalidity Contentions, *Nomadix, Inc. v. Hewlett-Packard Company, et al.*, Case No. 09-CV-8441 DDP (VBKx) and *Nomadix, Inc. v. Solutionic Technologies Limited*, Case No. 2:10-CV-00381 DDP (VBKx), (Central District of California, Western Division, and dated Jul. 22, 2011 in 25 pages.
Exhibit C4, Claim Comparison for U.S. Pat. No. 6,636,894, filed in Defendants' Supplemental Joint Invalidity Contentions, *Nomadix, Inc. v. Hewlett-Packard Company, et al.*, Case No. 09-CV-8441 DDP (VBKx) and *Nomadix, Inc. v. Solutionic Technologies Limited*, Case No. 2:10-CV-00381 DDP(VBKx), (Central District of California, Western Division, and dated Jul. 22, 2011, in 18 pages.
Exhibit C5, Claim Comparison for U.S. Pat. No. 7,194,554 filed in Defendants' Supplemental Joint Invalidity Contentions, *Nomadix, Inc. v. Hewlett-Packard Company, et al.*, Case No. 09-CV-8441 DDP (VBKx) and *Nomadix, Inc. v. Solutionic Technologies Limited*, Case No. 2:10-CV-00381 DDP (VBKx), (Central District of California, Western Division, and dated Jul. 22, 2011 in 18 pages.
Exhibit C6, Claim Comparison for U.S. Pat. No. 6,868,399 filed in Defendants' Supplemental Joint Invalidity Contentions, *Nomadix, Inc. v. Hewlett-Packard Company, et al.*, Case No. 09-CV-8441 DDP (VBKx) and *Nomadix, Inc. v. Solutionic Technologies Limited*, Case No. 2:10-CV-00381 DDP (VBKx), (Central District of California, Western Division, and dated Jul. 22, 2011 in 22 pages.
Exhibit C7, U.S. Pat. No. 7,689,716 filed in Defendants' Supplemental Joint Invalidity Contentions, *Nomadix, Inc. v. Hewlett-Packard Company, et al.*, Case No. 09-CV-8441 DDP (VBKx) and *Nomadix, Inc. v. Solutionic Technologies Limited*, Case No. 2:10-CV-00381 DDP (VBKx), (Central District of California, Western Division, and dated Jul. 22, 2011 in 11 pages.
Case No. 07-1946 GPS (VBK) *Nomadix, Inc. v. Second Rule LLC*, Complaint for Patent Infringement of U.S. Pat. No. 6,130,892; 7,088,727; 6,636,894; 6,857,009, and 6,868,399 dated Mar. 23, 2007.
Office Action dated Feb. 7, 2011, European Patent Application No. 07100292.7.
Hluchyj, M. G. et al., Queueing Disciplines for Integrated Fast Packet Networks, IEEE 1992, 7 pages.
"26th Annual HITEC® set for Jun. 16-18 in Los Angeles", http://www.hospitalitynet.org/news/4000506.html, Austin, TX, Jan. 14, 1998, pp. 4.
"Lodgenet Acquires Connect Group Delivers High—Speed Laptop Connectivity", Hotel Online Press Releases, Sioux Falls, SF, Jun. 16, 1998, pp. 2.
Breidenbach, Susan, "High-tech Hospitality," Network World, Mar. 30, 1998, vol. 15, No. 13. pp. 1, 43-44 & 46-47.
Case No. 2:14-cv-08256-RGKJEMx, *Nomadix, Inc., v. Hospitality Core Services LLC, d/b/a Blueprint RF*, Notice of Motion to Dismiss, Memorandum in Support of Motion to Dismiss and Proposed Order dated Nov. 19, 2014 in 29 pages.
Case No. CV14-08256 DDP (VBKx), *Nomadix, Inc., v. Hospitality Core Services LLC, d/b/a Blueprint RF*, Answer, Affirmative Defenses and Counterclaims and Demand for Jury Trial dated Apr. 17, 2015 in 34 pages.
Case No. CV14-08256 DDP (VBKx), *Nomadix, Inc., v. Hospitality Core Services LLC, d/b/a Blueprint RF*, First Amended Answer, Affirmative Defenses and Counterclaims and Demand for Jury Trial dated May 1, 2015 in 42 pages.
Case No. CV14-08256 DDP (VBKx), *Nomadix, Inc., v. Hospitality Core Services LLC, d/b/a Blueprint RF*, First Amended Complaint and Demand for Jury Trial dated Dec. 19, 2014 in 26 pages.
Case No. CV14-08256 DDP (VBKx), *Nomadix, Inc., v. Hospitality Core Services LLC, d/b/a Blueprint RF*, Nomadix's Opposition to Defendant's Motion to Dismiss Under Rule 12(b)(6) and 35 U.S.C. § 101 [including Appendix A & B] dated Feb. 9, 2015 in 77 pages.
Case No. CV14-08256 DDP (VBKx), *Nomadix, Inc., v. Hospitality Core Services LLC, d/b/a Blueprint RF*, Notice of Renewed Motion to Dismiss Under Rule 12(b) (6) and 35 U.S.C. §§ 271(b), (c) and (f), Memorandum in Support of Renewed Motion to Dismiss Under Rule 12(b) (6) and 35 U.S.C. §§ 271(b), (c) and (f) [including exhibits A-I] and Granting Renewed Motion to Dismiss Under Rule 12(b) (6) and 35 U.S.C. §§ 271(b), (c) and (f) dated Jan. 12, 2015 in 139 pages.
Case No. CV14-08256 DDP (VBKx), *Nomadix, Inc., v. Hospitality Core Services LLC, d/b/a Blueprint RF*, Opposition of Plaintiff

(56) References Cited

OTHER PUBLICATIONS

Nomadix, Inc. to Renewed Motion of Defendant Blueprint RF to Dismiss Under Rule 12(b)(6) and 35 U.S.C. § 271(b), (c), and (f) dated Feb. 9, 2015 in 24 pages.
Case No. CV14-08256 DDP (VBKx), *Nomadix, Inc., v. Hospitality Core Services LLC, d/b/a Blueprint RF,* Order on Motions to Dismiss dated Apr. 3, 2015 in 11 pages.
Case No. CV14-08256 DDP (VBKx), *Nomadix, Inc., v. Hospitality Core Services LLC, d/b/a Blueprint RF,* Reply in Support Motion to Dismiss Under Rule 12(b) (6) and 35 U.S.C. § 101 dated Feb. 23, 2015 in 22 pages.
Case No. CV14-08256 DDP (VBKx), *Nomadix, Inc., v. Hospitality Core Services LLC, d/b/a Blueprint RF,* Reply in Support Motion to Dismiss Under Rule 12(b) (6) and 35 U.S.C. §§ 271(b), (c) and (f) dated Feb. 23, 2015 in 22 pages.
Claim Charts, Defendant's Contentions relating to Case No. CACD 14-cv-08256, *Nomadix v. Hospitality Core Services,* re: U.S. Pat. 6,636,894 in 9 pages, dated Oct. 24, 2014.
Claim Charts, Defendant's Contentions relating to Case No. CACD 14-cv-08256, *Nomadix v. Hospitality Core Services,* re: U.S. Pat. No. 6,868,399 in 11 pages, dated Oct. 24, 2014.
Claim Charts, Defendant's Contentions relating to Case No. CACD 14-cv-08256, *Nomadix v. Hospitality Core Services,* re: U.S. Pat. No. 8,156,246 in 9 pages, dated Oct. 24, 2014.
Claim Charts, Defendant's Contentions relating to Case No. CACD 14-cv-08256, *Nomadix v. Hospitality Core Services,* re: U.S. Pat. No. 8,266,266 in 14 pages, dated Oct. 24, 2014.
Claim Charts, Defendant's Contentions relating to Case No. CACD 14-cv-08256, *Nomadix v. Hospitality Core Services,* re: U.S. Pat. No. 8,266,269 in 10 pages, dated Oct. 24, 2014.
Claim Charts, Defendant's Contentions relating to Case No. CACD 14-cv-08256, *Nomadix v. Hospitality Core Services,* re: U.S. Pat. No. 8,364,806 in 10 pages, dated Oct. 24, 2014.
Claim Charts, Defendant's Contentions relating to Case No. CACD 14-cv-08256, *Nomadix v. Hospitality Core Services,* re: U.S. Pat. No. 8,788,690 in 13 pages, dated Oct. 24, 2014.
Notification of Concurrent Litigation and Information in Case No. 2:14-CV-08256 titled Complaint for Infringement of U.S. Pat. No. 6,636,894; 6,868,399; 7,698,432; 7,953,857; 8,156,246; 8,266,266; 8,266,269; 8,364,806; 8,725,888; and 8,788,690 and Demand for Jury Trial dated Oct. 24, 2014 in 21 pages.
Rizzo, Luigi, "Dummynet: A Simple Approach to the Evaluation of Network Protocols," ACM Computer Communication Review, vol. 27, No. 1, Jan. 1997, pp. 31-41.
Tanenbaum, Andrew S., "Computer Networks" Prentice Hall of India, 3rd Edition, May 2000, Chapter 5, Section 3, pp. 380-384.
Case No. 2:14-cv-08256 DDP (VBKx), *Nomadix, Inc.* v. *Hospitality Core Services LLC, d/b/a Blueprint RF,* [028] Order on Stipulation to Advance Hearing Date and Regarding Amended Pleadings As Modified by the Court, dated Dec. 23, 2014 in 2 pages.
Case No. 2:14-cv-08256 DDP (VBKx), *Nomadix, Inc.* v. *Hospitality Core Services LLC, d/b/a Blueprint RF,* [051] First Amended Answer, Affirmative Defenses and Counterclaims and Demand for Jury Trial, dated May 1, 2015 in 42 pages.
Case No. 2:14-cv-08256 DDP (VBKx), *Nomadix, Inc.* v. *Hospitality Core Services LLC, d/b/a Blueprint RF,* [069] Order Granting In Part and Denying In Part Motion to Dismiss/Strike Counterclaims and Defenses, dated Jun. 29, 2015 in 25 pages.
Case No. 2:14-cv-08256 DDP (VBKx), *Nomadix, Inc.* v. *Hospitality Core Services LLC, d/b/a Blueprint RF,* [070] Nomadix's Answer to Defendant's Amended Counterclaims, dated Jul. 13, 2015 in 12 pages.
Ex 1020, "HITIS Project Successfully Conducts Alpha Tests at Hospitality Technology Conference," Hotel Online, available from internet at http://www.hotel-online.com/News/PressReleases1998_2nd/June98_HITISProject.html, posted Jun. 17, 1998, site visited Jun. 4, 2015, in 3 pages.
Ex 1021, "HITIS Successfully Completes Beta Tests Involving POS to PMS Interfaces," Hotel Online, available from internet at http://www.hotel-online.com/News/PressReleases1998_4th/Nov98_HITIS.html, posted Nov. 9, 1998, site visited Jun. 4, 2015, in 3 pages.
Ex 1022, "High-speed access to the Internet is beginning to be a feature in some hotel guest rooms," The New York Times: Business Travel, available from internet at http://www.nytimes.com/1996/10/30/business/high-speed-access-internet-beginning-be-feat . . . , posted Oct. 30, 1996, site visited Jun. 17, 2015, in 2 pages.
Ex 1023, "Commercial Trials of High-Speed Internet Access Hospitality Solution Under Way," News Center, available from internet at http://news.microsoft.com/1998/03/04/commercial-trials-of-high-speed-internet-access-hospitality-solution-under-way/, posted Mar. 4, 1998, site visited May 5, 2015, in 7 pages.
Ex 1024, "Royal Caribbean International Introduces Onboard Guest Internet Communications Centers," Royal Caribbean Cruises Ltd., available from internet at http://www.rclinvestor.com/phoenix.zhtml?c=103045&p=irol-newsArticle&Id=48416, posted Aug. 24, 1999, site visited Jun. 17, 2015, in 2 pages.
Ex 1026, "26th Annual HITEC® Set for Jun. 16-18 in Los Angeles," available from internet at http://www.hospitalitynet.org/news/4000506.html, posted Jan. 14, 1998, site visited Dec. 15, 2014, in 4 pages.
Ex 1028, "IPORT Reduces Costs and Complications, Increases Speed and Reliability of Remote Internet Access," News Center, available from internet at http://news.microsoft.com/1998/06/17/iport-reduces-costs-and-complications-increases-speed-and-reliability-of-remote-internet-access/, posted Jun. 17, 1998, site visited Apr. 14, 2015, in 4 pages.
Ex 1029, "Lodgenet Acquires Connect Group Delivers High-Speed Laptop Connectivity," Hotel Online, posted Jun. 16, 1998, in 2 pages.
Ex 1030, "IPORT Version 2.0 Released," Business Wire, posted Jul. 20, 1998, in 2 pages.
Ex 1033, IPORT Internet Access System: Connection Methods and Concepts for IPORT v2.x, ATCOM/INFO, Nov. 1998, in 12 pages.
Ex 1035, Internet Archive Wayback Machine, "IPORT—Wingate Inn Sets Industry Standard by Introducing Latest Technologicalenity—High-Speed Internet Access," available from internet at http://web.archive.org/web/19990225082417/http://www.atcominfo.com/Press/october/pr-wingate.htm, posted Oct. 29, 1998, site visited Jun. 9, 2015, in 2 pages.
Ex 1037, Messmer, E., Network World, Dec. 7, 1998, in 1 page.
Ex 1043, "CAIS Acquires ATCOM's Server and Software Systems for the Hotel Industry," Hotel Online, available from internet at http://www.hotel-online.com/News/PressReleases1999_3rd/Aug99_CAISAtcom.html, posted Aug. 4, 1999, site visited Dec. 3, 2014, in 3 pages.
Email to Tim McGreevy, Re: New patent application, Sep. 30, 1998, in 4 pages.
Letter from Michael J. Mehrman to Mark Lezama, Re: *Nomadix, Inc.* v. *Hospitality Core Services, LLC,* Civil Action Case No. 2:14-CV-08256 in the United States District Court for the Central District of California, dated Jul. 8, 2015, in 17 pages.
Letter from Michael J. Mehrman to Mark Lezama, Re: *Nomadix, Inc.* v. *Hospitality Core Services, LLC,* Civil Action Case No. 2:14-CV-08256 in the United States District Court for the Central District of California, dated Jul. 8, 2015, in 3 pages.
Case No. 2:14-cv-08256 DDP (VBKx), *Nomadix, Inc.* v. *Hospitality Core Services LLC, d/b/a Blueprint RF,* Defendant's Supplemental Responses to Plaintiff's First Interrogatories, dated Jun. 8, 2015 in 23 pages.
Case No. 2:14-cv-08256, *Nomadix v. Hospitality Core Services,* Nomadix Essential Feature Chart, date unknown, in 7 pages.
Case No. 2:14-cv-08256 DDP (VBKx), *Nomadix, Inc.* v. *Hospitality Core Services LLC, d/b/a Blueprint RF,* Defendant's Third Interrogatories, dated Jul. 10, 2015 in 5 pages.
Case No. 2:14-cv-08256 DDP (VBKx), *Nomadix, Inc.* v. *Hospitality Core Services LLC, d/b/a Blueprint RF,* Defendant's Third Requests for Admissions, dated Jul. 10, 2015 in 12 pages.
Case No. 2:14-cv-08256 DDP (VBKx), *Nomadix, Inc.* v. *Hospitality Core Services LLC, d/b/a Blueprint RF,* Defendant's Responses to Plaintiff's First Requests for Admissions, dated Jun. 1, 2015 in 11 pages.

(56) References Cited

OTHER PUBLICATIONS

Case No. 2:14-cv-08256 DDP (VBKx), *Nomadix, Inc.* v. *Hospitality Core Services LLC, d/b/a Blueprint RF*, Defendant's Responses to Plaintiff's First Requests for Production, dated Jun. 1, 2015 in 29 pages.
Case No. 2:14-cv-08256, *Nomadix* v. *Hospitality Core Services*, Claim Chart for U.S. Pat. No. 8,156,246 with respect to Slemmer U.S. Pat. No. 6,226,677 and Vu U.S. Pat. No. 5,623,601, dated Jun. 1, 2015, in 14 pages.
Case No. 2:14-cv-08256, *Nomadix* v. *Hospitality Core Services*, Claim Charts for U.S. Pat. Nos. 6,636,894; 6,868,399; 8,156,246; 8,266,266; 8,266,269; 8,364,806; 8,788,690 with respect to reference 6,226,677, dated Jun. 1, 2015, in 79 pages.
Letter from Michael J. Mehrman to Mark Lezama, Re: *Nomadix, Inc.* v. *Hospitality Core Services, LLC*, Civil Action Case No. 2:14-CV-08256 in the United States District Court for the Central District of California, dated Jun. 26, 2015, in 8 pages.
Case No. 2:14-cv-08256 DDP (VBKx), *Nomadix, Inc.* v. *Hospitality Core Services LLC, d/b/a Blueprint RF*, Nomadix's Responses to Blueprint RF's First Set of Requests for Admission (1-24), dated Jun. 1, 2015 in 16 pages.
Case No. 2:14-cv-08256 DDP (VBKx), *Nomadix, Inc.* v. *Hospitality Core Services LLC, d/b/a Blueprint RF*, Nomadix's Responses to Blueprint RF's First Set of Requests for Production of Documents (1-10), dated Jun. 2, 2015 in 10 pages.
Letter from Kelly H. Hughes to Ron Peterson, dated Jun. 16, 2015, 2 pages.
Case No. 2:14-cv-08256 DDP (VBKx), *Nomadix, Inc.* v. *Hospitality Core Services LLC, d/b/a Blueprint RF*, Nomadix's Responses to Blueprint RF's Second Interrogatories (11-16), dated Jun. 18, 2015 in 43 pages.
Case No. 2:14-cv-08256 DDP (VBKx), *Nomadix, Inc.* v. *Hospitality Core Services LLC, d/b/a Blueprint RF*, Nomadix's Responses to Blueprint RF's Second Requests for Admission (25-75), dated Jun. 18, 2015 in 36 pages.
Case No. 2:14-cv-08256 DDP (VBKx), *Nomadix, Inc.* v. *Hospitality Core Services LLC, d/b/a Blueprint RF*, Nomadix's Second Set of Interrogatories to Defendant Blueprint RF (6-7), dated Jul. 10, 2015 in 4 pages.
Letter from Mark Lezama to Michael J. Mehrman, Re: *Nomadix, Inc.* v. *Hospitality Core Services, LLC*, No. CV14-08256 DDP (VBKx), dated Jul. 13, 2015, in 4 pages.
Letter from Michael J. Mehrman to Mark Lezama, Re: *Nomadix, Inc.* v. *Hospitality Core Services, LLC*, Civil Action Case No. 2:14-CV-08256 in the United States District Court for the Central District of California, dated Jul. 13, 2015, in 3 pages.
Letter from Michael J. Mehrman to Kelly H. Hughes, Re: Your letter to Ron Peterson of Blueprint FR dated Jun. 16, 2015, *Nomadix, Inc.* v. *Hospitality Core Services, LLC*, Civil Action Case No. 2:14-CV-08256 in the United States District Court for the Central District of California, dated Jun. 17, 2015, in 64 pages.
Case No. 2:14-cv-08256 DDP (VBKx), *Nomadix, Inc.* v. *Hospitality Core Services LLC, d/b/a Blueprint RF*, Defendant's Responses to Plaintiff's Second Interrogatories, dated Jul. 17, 2015 in 8 pages.
Case No. 2:14-cv-08256 DDP (VBKx), *Nomadix, Inc.* v. *Hospitality Core Services LLC, d/b/a Blueprint RF*, Defendant's Second Requests for Admissions, dated May 15, 2015 in 12 pages.
Case No. 2:14-cv-08256 DDP (VBKx), *Nomadix, Inc.* v. *Hospitality Core Services LLC, d/b/a Blueprint RF*, Defendant's Second Supplemental Responses to Plaintiff's First Interrogatories, dated Jul. 17, 2015 in 10 pages.
Claim Chart, U.S. Pat. No. 8,156,246 B2 with respect to Slemmer U.S. Pat. No. 6,226,677, dated Jul. 28, 2015, in 17 pages.
Claim Chart, U.S. Pat. No. 8,156,246 with respect to ATCOM/IPORT White Papers, dated Jul. 17, 2015, in 5 pages.
Claim Chart, U.S. Pat. No. 6,636,894 with respect to Slemmer U.S. Appl. No. 60/109,878 and Ex 1044 Vos article, dated Jul. 24, 2015, in 31 pages.
Claim Charts, U.S. Pat. Nos. 6,636,894; 8,156,246; 8,266,266; 8,266,269; 8,364,806 with respect to ATCOM/IPORT White Papers, dated Jul. 24, 2015, in 83 pages.
Claim Charts, U.S. Pat. Nos. 6,636,894; 8,156,246; 8,266,266; 8,266,269; 8,364,806 with respect to ATCOM/IPORT White Papers and Secondary Reference ATCOM Manual, dated Jul. 17, 2015, in 79 pages.
Claim Charts, U.S. Pat. Nos. 6,868,399; 8,788,690; with respect to Reference ATCOM/IPORT White Papers, dated Jul. 24, 2015, in 46 pages.
Claim Charts, U.S. Pat. Nos. 6,868,399; 8,788,690 with respect to Reference ATCOM 430, Reference Micros-Fidelio, and Reference Short PCT, dated Jul. 17, 2015, in 56 pages.
Claim Charts, U.S. Pat. Nos. 6,868,399; 8,788,690; with respect to Reference ATCOM/IPORT White Papers and Reference ATCOM Manual, dated Jul. 17, 2015, in 37 pages.
Claim Chart, U.S. Pat. Nos. 6,868,399; 8,788,690 with respect to Reference U.S. Pat. No. 6,226,677, and Micros-Fidelio, dated Jul. 24, 2015, in 35 pages.
FreeBSD, available online at https://www.freebsd.org/cgi/man.cgi?query=ipfw%288%29&sektion=, site visited on Mar. 9, 2015, pp. 1, 9-10.
Ex 1025, User's Guide to Installing IPORT Server, Apr. 9, 1999, in 22 pages.
Ex 1034, IPORT Internet Access System: IPORT Central Office Solution, White Paper, Nov. 1998, in 22 pages.
U.S. Appl. No. 60/109,878, filed Nov. 25, 1998, Slemmer.
U.S. Appl. No. 60/054,687, filed Aug. 1, 1997, Nair et al.
Hamblen, Matt, "YesWare," ComputerWorld, vol. 33, No. 16, Apr. 19, 1999 in 11 pages.
"ATCOM/INFO Announces IPORT 2.5 for High-Speed Internet Access," Business Wire, Oct. 21, 1998 in 6 pages.
IPORT Internet Access System, Installation Guide, 1997-1999 ATCOM, Inc. in 222 pages.
IPORT Internet Access System, Installation Guide, New Version. 4.0, date Unknown in 330 pages.
IPORT, User's Guide to Installing IPORT Server, ATCOM/INFO, Apr. 9, 1999 (Part 1 of 2) in 300 pages.
IPORT, User's Guide to Installing IPORT Server, ATCOM/INFO, Apr. 9, 1999 (Part 2 of 2) in 300 pages.
"Microsoft Awards Hospitality Industry's Top Software Developers," News Center, Jun. 17, 1998 in 6 pages.
Estrin et al., "Visa Scheme for Inter-Organization Network Security," Computer Science Department, University of Southern California, IEEE, 1987 in 10 pages.
Interface Application Specification, Interface Application Specification V1.11, micros FIDELIO Software GmbH & Co. KG, Jan. 1998 in 42 pages.
AT&T INTUITY Lodging Property Management System Specifications, Issue 1, Dec. 1995 in 126 pages.
Dummynet, FreeBSD 10.1, Sep. 28, 1998 in 5 pages.
IPORT, Internet Access System, IPORT Central Office Solution, White Paper, Nov. 1998 —ATCOM/INFO in 35 pages.
ATCOM/INFO Releases IPORT Central Office Solution, Oct. 21, 1998 in 5 pages.
NEC Property Management System Communication Interface Specification (Jun. 1998) in 116 pages.
RFC 1636, Report of IAB Workshop on Security in the Internet Architecture, IAB Workshop Report, Jun. 1994 in 52 pages.
"Elastic Networks Unveils YesWare; Mobility Software Solution Targets Visitor-Based Networking," PRNewswire, Apr. 12, 1999 in 1 page.
RFC 1919, Classical versus Transparent IP Proxies, Mar. 1996 in 36 pages.
RFC 2139, RADIUS Accounting, Apr. 1997 in 26 pages.
STSN Announces Exclusive Agreement As Marriott International's High-Speed Internet Service Provider, Sep. 2, 1999 in 1 page.
Tut Systems Acquires Public Port, Inc., PR Newswire, Jun. 8, 1999 in 2 pages.
"ATCOM/INFO's IPORT Brings High Speed Access to Hotels in Japan and Mexico;" ATCOM and Tut Systems Partner to Expand International Presence of 'Plug and Play' Internet Access, Hospitalitynet.org, May 11, 1999 in 2 pages.

(56) References Cited

OTHER PUBLICATIONS

"ATCOM/INFO Makes High-Speed Internet Access to Corporate Networks Secure for Business Travelers," Hospitalitynet.org, Jun. 17, 1999 in 1 page.
"Tut Systems Launches Hotel Internet Management System," Hospitalitynet.org, Jun. 23, 1999 in 1 page.
Qu, et al., "A Mobile TCP Socket," The Australian National University, Apr. 1997 in 26 pages.
Lynch, Clifford, A White Paper on Authentication and Access Management Issues in Cross-organizational Use of Networked Information Resources, Apr. 14, 1998.
Case No. 2:14-cv-08256 DDP (VBKx), *Nomadix, Inc.* v. *Hospitality Core Services LLC, d/b/a Blueprint RF*, Notice of Motion and Motion to Dismiss Under Rule 12(b)(6) and 35 U.S.C. § 101 dated Jan. 12, 2015 in 133 pages.
Case No. 2:14-cv-08256 DDP (VBKx), *Nomadix, Inc.* v. *Hospitality Core Services LLC, d/b/a Blueprint RF*, Stipulation to Continue Hearing Date on Motions to Dismiss dated Jan. 19, 2015 in 5 pages.
Case No. 2:14-cv-08256 DDP (VBKx), *Nomadix, Inc.* v. *Hospitality Core Services LLC, d/b/a Blueprint RF*, Order Granting Stipulation to Continue Hearing Date dated Feb. 5, 2015 in 2 pages.
Case No. 2:14-cv-08256 DDP (VBKx), *Nomadix, Inc.* v. *Hospitality Core Services LLC, d/b/a Blueprint RF*, Declaration of Alan G. Laquer in Support of Nomadix's Opposition to Blueprint RF's Renewed Motion to Dismiss Under Rule 12(b)(6) and 35 U.S.C. § 271(b), (c), and (f) dated Feb. 9, 2015 in 156 pages.
Case No. 2:14-cv-08256 DDP (VBKx), *Nomadix, Inc.* v. *Hospitality Core Services LLC, d/b/a Blueprint RF*, Declaration of Alan G. Laquer in Support of Nomadix's Opposition to Blueprint RF's Motion to Dismiss Under Rule 12(b)(6) and 35 U.S.C. § 101 dated Feb. 9, 2015 in 156 pages.
Case No. 2:14-cv-08256 DDP (VBKx), *Nomadix, Inc.* v. *Hospitality Core Services LLC, d/b/a Blueprint RF*, Blueprint RF's Reply in Support of Motion to Dismiss Under Rule 12(b)(6) and 35 U.S.C. §§ 271(b), (c) and (f) dated Feb. 23, 2015 in 22 pages.
Case No. 2:14-cv-08256 DDP (VBKx), *Nomadix, Inc.* v. *Hospitality Core Services LLC, d/b/a Blueprint RF*, Reply Declaration of Michael J. Mentrman in Support of Motion to Dismiss Under Rule 12(b)(6) and 35 U.S.C. §§ 271(b), (c) and (f) dated Feb. 23, 2015 in 14 pages.
Case No. 2:14-cv-08256 DDP (VBKx), *Nomadix, Inc.* v. *Hospitality Core Services LLC, d/b/a Blueprint RF*, Reply Declaration of Michael J. Mentrman in Support of Motion to Dismiss Under Rule 12(b)(6) and 35 U.S.C. §§ 101 dated Feb. 23, 2015 in 28 pages.
Case No. 2:14-cv-08256 DDP (VBKx), *Nomadix, Inc.* v. *Hospitality Core Services LLC, d/b/a Blueprint RF*, Rule 26(f) Report dated Apr. 24, 2015 in 16 pages.
Case No. 2:14-cv-08256 DDP (VBKx), *Nomadix, Inc.* v. *Hospitality Core Services LLC, d/b/a Blueprint RF*, Defendant's Second Interrogatories (Nos. 11-16) dated May 15, 2015 in 4 pages.
Case No. 2:14-cv-08256 DDP (VBKx), *Nomadix, Inc.* v. *Hospitality Core Services LLC, d/b/a Blueprint RF*, Notice of Motion and Motion to Dismiss Certain Counterclaims and Strike Corresponding Defenses dated May 18, 2015 in 4 pages.
Case No. 2:14-cv-08256 DDP (VBKx), *Nomadix, Inc.* v. *Hospitality Core Services LLC, d/b/a Blueprint RF*, Nomadix's Opening Brief on its Motion to Dismiss Certain Counterclaims and Strike Corresponding Defenses dated May 18, 2015 in 19 pages.
Case No. 2:14-cv-08256 DDP (VBKx), *Nomadix, Inc.* v. *Hospitality Core Services LLC, d/b/a Blueprint RF*, Declaration of Mark Lezama in Support of Nomadix's Motion to Dismiss Certain Counterclaims and Strike Corresponding Defenses dated May 18, 2015 in 95 pages.
Case No. 2:14-cv-08256 DDP (VBKx), *Nomadix, Inc.* v. *Hospitality Core Services LLC, d/b/a Blueprint RF*, Opposition to Motion to Dismiss and Strike dated May 26, 2015 in 30 pages.
Case No. 2:14-cv-08256 DDP (VBKx), *Nomadix, Inc.* v. *Hospitality Core Services LLC, d/b/a Blueprint RF*, Declaration of Michael J. Mehrman in Support of Opposition to Motion to Dismiss and Strike dated May 26, 2015 in 61 pages.
Case No. 2:14-cv-08256 DDP (VBKx), *Nomadix, Inc.* v. *Hospitality Core Services LLC, d/b/a Blueprint RF*, Revised Opposition to Motion to Dismiss and Strike dated May 27, 2015 in 30 pages.
Case No. 2:14-cv-08256 DDP (VBKx), *Nomadix, Inc.* v. *Hospitality Core Services LLC, d/b/a Blueprint RF*, Revised Declaration of Michael J. Mehrman in Support of Opposition to Motion to Dismiss and Strike dated May 27, 2015 in 61 pages.
Case No. 2:14-cv-08256 DDP (VBKx), *Nomadix, Inc.* v. *Hospitality Core Services LLC, d/b/a Blueprint RF*, Defendant's Responses to Plaintiff's First Interrogatories dated Jun. 1, 2015 in 24 pages.
Case No. 2:14-cv-08256 DDP (VBKx), *Nomadix, Inc.* v. *Hospitality Core Services LLC, d/b/a Blueprint RF*, Nomadix's Reply Brief on its Motion to Dismiss Certain Counterclaims and Strike Corresponding Defenses dated Jun. 2, 2015 in 31 pages.
Case No. 2:14-cv-08256 DDP (VBKx), *Nomadix, Inc.* v. *Hospitality Core Services LLC, d/b/a Blueprint RF*, Supplemental Declaration of Mark Lezama in Support of Nomadix's Motion to Dismiss Certain Counterclaims and Strike Corresponding Defenses dated Jun. 2, 2015 in 59 pages.
Case No. 2:14-cv-08256 DDP (VBKx), *Nomadix, Inc.* v. *Hospitality Core Services LLC*, Non-Infringement Claim Chart, Accused Product Dominion Gateway, U.S. Pat. No. 6,636,894 dated Jun. 1, 2015 in 38 pages.
Exhibit 2, Claims and Support for U.S. Pat. Nos. 8,156,246; 8,266,266; 8,266,269; 8,364,806; 6,886,399; 8,788,690, dated Jun. 1, 2015 in 32 pages.
Case No. 2:14-cv-08256 DDP (VBKx), *Nomadix, Inc.* v. *Hospitality Core Services LLC, d/b/a Blueprint RF*, [74] Declaration of Mark Lezama in Support of Nomadix's Motion for Summary Judgment of Infringement of the '246 Patent, dated Jul. 30, 2015 in 212 pages.
Case No. 2:14-cv-08256 DDP (VBKx), *Nomadix, Inc.* v. *Hospitality Core Services LLC, d/b/a Blueprint RF*, [80] Memorandum in Support of Motion for Partial Summary Judgment of Patent Invalidity Under 35 § 112 and Double Patenting, dated Aug. 6, 2015 in 186 pages. (Part 1 of 2).
Case No. 2:14-cv-08256 DDP (VBKx), *Nomadix, Inc.* v. *Hospitality Core Services LLC, d/b/a Blueprint RF*, [80] Memorandum in Support of Motion for Partial Summary Judgment of Patent Invalidity Under 35 § 112 and Double Patenting, dated Aug. 6, 2015 in 187 pages. (Part 2 of 2).
Case No. 2:14-cv-08256 DDP (VBKx), *Nomadix, Inc.* v. *Hospitality Core Services LLC, d/b/a Blueprint RF*, [83] Opposition to Nomadix's Motion for Partial Summary Judgment of Infringement of '246 Patent and Cross-Motion for Judgment of Non-Infringement, dated Aug. 7, 2015 in 105 pages.
Case No. 2:14-cv-08256 DDP (VBKx), *Nomadix, Inc.* v. *Hospitality Core Services LLC, d/b/a Blueprint RF*, [87] Memorandum in Support of Motion for Partial Summary Judgment of Patent Invalidity Under 35 U.S.C. §§ 102 and 103, dated Aug. 12, 2015 in 200 pages. (Part 1 of 3).
Case No. 2:14-cv-08256 DDP (VBKx), *Nomadix, Inc.* v. *Hospitality Core Services LLC, d/b/a Blueprint RF*, [87] Memorandum in Support of Motion for Partial Summary Judgment of Patent Invalidity Under 35 U.S.C. §§ 102 and 103, dated Aug. 12, 2015 in 204 pages. (Part 2 of 3).
Case No. 2:14-cv-08256 DDP (VBKx), *Nomadix, Inc.* v. *Hospitality Core Services LLC, d/b/a Blueprint RF*, [87] Memorandum in Support of Motion for Partial Summary Judgment of Patent Invalidity Under 35 U.S.C. §§ 102 and 103, dated Aug. 12, 2015 in 198 pages. (Part 3 of 3).
Case No. 2:14-cv-08256 DDP (VBKx), *Nomadix, Inc.* v. *Hospitality Core Services LLC, d/b/a Blueprint RF*, [72-2] Nomadix's Statement of Uncontroverted Facts and Conclusions of Law in Support of its Motion for Summary Judgment of Infringement of the '246 Patent, dated Jul. 30, 2015 in 5 pages.
Case No. 2:14-cv-08256 DDP (VBKx), *Nomadix, Inc.* v. *Hospitality Core Services LLC, d/b/a Blueprint RF*, [79] Nomadix's Opening Brief on its Motion for Summary Judgment of Infringement of the '246 Patent, dated Jul. 30, 2015 in 32 pages.
Case No. 2:14-cv-08256 DDP (VBKx), *Nomadix, Inc.* v. *Hospitality Core Services LLC, d/b/a Blueprint RF*, [82] Statement of Uncontested Facts and Conclusions of Law, dated Aug. 6, 2015 in 12 pages.

(56) References Cited

OTHER PUBLICATIONS

Case No. 2:14-cv-08256 DDP (VBKx), *Nomadix, Inc.* v. *Hospitality Core Services LLC, d/b/a Blueprint RF*, [84] Opposition to Nomadix's Motion for Partial Summary Judgment of Infringement of '246 Patent and Cross-Motion for Judgment of Non-Infringement Statement of Facts and Conclusions of Law, dated Aug. 7, 2015 in 12 pages.

Case No. 2:14-cv-08256 DDP (VBKx), *Nomadix, Inc.* v. *Hospitality Core Services LLC, d/b/a Blueprint RF*, [86] Opposition to Nomadix's Motion for Partial Summary Judgment of Infringement of '246 Patent and Cross-Motion for Judgment of Non-Infringement Statement of Facts and Conclusions of Law, dated Aug. 8, 2015 in 11 pages.

Case No. 2:14-cv-08256 DDP (VBKx), *Nomadix, Inc.* v. *Hospitality Core Services LLC, d/b/a Blueprint RF*, [88-1] Memorandum in Support of Motion for Partial Summary Judgment of Patent Invalidity Under 35 U.S.C. §§ 102 and 103, dated Aug. 12, 2015 in 20 pages.

Case No. 2:14-cv-08256 DDP (VBKx), *Nomadix, Inc.* v. *Hospitality Core Services LLC, d/b/a Blueprint RF*, Nomadix's First Supplemental Response to Blueprints RF's Interrogatory 6, dated Aug. 8, 2015 in 6 pages.

Case No. 2:14-cv-08256 DDP (VBKx), *Nomadix, Inc.* v. *Hospitality Core Services LLC, d/b/a Blueprint RF*, Nomadix's First Supplemental Responses to Blueprint RF's Interrogatories 11 and 12, dated Aug. 8, 2015 in 42 pages.

Case No. 2:14-cv-08256 DDP (VBKx), *Nomadix, Inc.* v. *Hospitality Core Services LLC, d/b/a Blueprint RF*, Defendant's Third Supplemental Responses to Plaintiff's First Interrogatories, dated Aug. 3, 2015 in 7 pages.

Commented Dominion Source Code Excerpts dated Aug. 4, 2015 in 4 pages.

Exhibit 13, Claim Construction Table sent Aug. 3, 2015 in 1 page.

\* cited by examiner

SYSTEMS AND METHODS FOR DYNAMIC DATA TRANSFER MANAGEMENT ON A PER SUBSCRIBER BASIS IN A COMMUNICATIONS NETWORK

CROSS-REFERENCE TO RELATED APPLICATIONS

The present application is a continuation of U.S. patent application Ser. No. 13/094,769, filed Apr. 26, 2011, which is a continuation of U.S. patent application Ser. No. 12/771,915, filed Apr. 30, 2010, now U.S. Pat. No. 7,953,857, which is a continuation of U.S. patent application Ser. No. 09/693,481, filed Oct. 20, 2000, now U.S. Pat. No. 7,739,383, which claims priority from U.S. Provisional Patent Application No. 60/161,182, filed Oct. 22, 1999, the contents of all of which are incorporated by reference in their entirety.

BACKGROUND

1. Field of the Invention

The present invention relates generally to bandwidth management in a communications network and, more particularly, to a method and apparatus for providing dynamic bandwidth management on a per subscriber basis in a communications network 2. Description of the Related Art In order for a host to function properly in a network environment, the host must be appropriately configured. Among other things, this configuration process establishes the protocol and other parameters by which the host transmits and receives data. In one common example, a plurality of hosts are networked to create a local area network (LAN). In the LAN, each host must be appropriately configured in order to exchange data over the network. Since most networks are customized to meet a unique set of requirements, hosts that are part of different networks are generally configured in different manners in order to appropriately communicate with their respective networks.

While desktop computers generally remain a part of the same network for a substantial period of time, laptops or other portable computers are specifically designed to be transportable. As such, portable computers are connected to different networks at different times depending upon the location of the computer. In a common example in which the portable computer serves as an employee's desktop computer, the portable computer is configured to communicate with their employer's network, i.e., the enterprise network. When the employee travels, however, the portable computer may be connected to different networks that communicate in different manners. In this regard, the employee may connect the portable computer to the network maintained by an airport or by a hotel in order to access the enterprise network, the internet or some other on-line service. Since these other networks are configured somewhat differently, however, the portable computer must also be reconfigured in order to properly communicate with these other networks. Typically, this configuration is performed by the user each time that the portable computer is connected to a different network. As will be apparent, this repeated reconfiguration of the portable computer is not only quite time consuming, but is also prone to errors.

A universal subscriber gateway device has been developed by Nomadix, Incorporated of Santa Monica, Calif. This universal subscriber gateway is described by U.S. patent application Ser. No. 08/816,174, entitled "Nomadic Router", filed in the name of inventor Short et. al., on Mar. 12, 1997 and Ser. No. 09/458,602, entitled "Systems and Methods for Authorizing, Authenticating and Accounting Users Having Transparent Computer Access to a Network Using a Gateway Device", filed in the name of inventor Short et. al., on Dec. 8, 1999. These applications have been assigned to Nomadix, the same assignee of the present invention. The contents of both of these applications are herein incorporated by reference as if fully set forth here within. The gateway device serves as an interface connecting the user/subscriber to a number of networks or other online services. For example, the gateway device can serve as a gateway to the Internet, the enterprise network, or other networks and/or on-line services. In addition to serving as a gateway, the gateway device automatically adapts to the protocols and other parameters of the host, in order that it may communicate with the new network in a manner that is transparent both to the user/subscriber and the new network. Once the gateway device has appropriately adapted data packets transmitted from a host, the host can appropriately communicate via the new network, such as the network at a hotel or at an airport, in order to access other networks, such as the enterprise network, or other online services, such as the internet.

The user/subscriber, and more specifically the remote or laptop user, benefits from being able to access a myriad of communication networks without having to undergo the time-consuming and all-too-often daunting task of reconfiguring their host in accordance with network specific configurations. In this fashion, the gateway device is capable of providing more efficient network access to the user/subscriber. A gateway device is also instrumental in providing the user/subscriber broadband network access that can be tailored to the user/subscriber's needs. In many instances the remote user/subscriber is concerned with being able to acquire network access and levels of service in the most cost-effective manner. Correspondingly, the gateway device administrator desires the capability to be able to offer the user/subscriber numerous different services and billing rate options. By way of example, the remote user/subscriber in a hotel environment may desire a network subscription for the duration of their hotel stay while the user/subscriber in an airport may desire a network subscription for the duration of their layover or until their scheduled flight departs. Additionally, a user/subscriber may desire a certain level of service based on bandwidth concerns and the need for higher or lower data rate transfers. For example, the user/subscriber who is accessing a network for the purpose of viewing text may desire a lower bandwidth service level that meets their particular needs, however, another user/subscriber who is accessing a network for the purpose of downloading files or media-rich content may desire a higher bandwidth service level capable of transferring data at relatively higher speeds.

In today's fast paced computing and networking environment it is even more advantageous to provide these service and billing options dynamically, allowing the user/subscriber to change, for example, billing rates or bandwidth capacity while a network session is on going. This would allow the user/subscriber to be billed at one rate while downloading the data-intensive file or media-rich content while choosing a more cost-effective billing structure for the less data-intensive activities, such as electronic mail (e-mail). As yet another example, the user/subscriber may be sending and/or receiving data-intensive content which requires a certain minimum transfer rate in order to be effectively communicated at the receiving end, such as voiceover IP or video. In such cases, the user/subscriber may desire some guarantee of delivery of the dataintensive content at a relatively higher cost.

Additionally, the dynamic nature of this process would allow the user/subscriber to change service levels or billing rates without the need to exit the network and initiate a new log-on procedure. In effect, the user/subscriber benefits from having a more efficient and less time-consuming means of altering service levels and billing structure.

However, in current network implementations, bandwidth management is typically performed statically, at the time a new subscriber account is established. The new subscriber typically selects a service level and billing structure defining a particular transmission rate (i.e., bandwidth) when establishing the account, and is not afforded the option of changing their service level or billing structure dynamically. In a common example, the service provider configures the network to provide the new subscriber with the subscriber selected bandwidth service level, which typically involves the service provider configuring hardware devices under the control of the service provider, such as a modem or access controller. The user/subscriber is not allowed to dynamically change the bandwidth, but must contact the service provider and request a change in their configuration to allow a higher or lower transmission rate. In response to such a request, the service provider typically assigns a technician to manually implement the reconfiguration of the hardware device(s) and/or other devices or records. In some instances, the subscriber also may be required to reconfigure their host to accommodate the changes in the bandwidth service level.

Therefore, an unsatisfied need exists in the industry for dynamic management of network access bandwidth, particularly when purchasing network access for a relatively short time, such as in an airport or hotel, or with varying network access speed requirements while at home or in the office.

SUMMARY OF THE INVENTION

The present invention comprises a method and device for dynamic bandwidth management on a per subscriber basis. The user/subscriber can independently set and adjust independently the uplink and downlink bandwidths of their network access service. Thus, the user/subscriber can efficiently manage their network access according to the specific activity on the network.

For example, a user/subscriber can select a relatively high maximum bandwidth for the downlink connection when accessing data-intensive content over the network, or a relatively low bandwidth for the downlink connection when accessing less data-intensive content over the network. The change in bandwidth service level is automatically made substantially instantaneously, and the user/subscriber begins receiving service at the new bandwidth and, in most instances, at a corresponding new billing rate. Likewise, the user/subscriber can increase or decrease the bandwidth of the uplink connection so the user/subscriber only purchases the amount of bandwidth appropriate for their network activity.

In addition, the bandwidth manager provides active management of the delivery of data (also known as and referred to herein as traffic shaping) to increase throughput from the gateway device onto the network. This balances the load on the subsequent link; thereby preventing dropped packets or longer delays.

In one embodiment of the invention, a method is defined for dynamic control of data transfer (i.e. bandwidth) by a subscriber in a communications network. The method comprises receiving a data packet at a network device, typically a gateway device and retrieving a subscriber selected bandwidth for the subscriber associated with the data packet. A determination is then made as to whether the transfer rate for data packet transmission should be limited based on the subscriber selected bandwidth. If it is determined that limitation is warranted then the transfer rate for data packet transmission is limited.

In another embodiment of the present invention, a method is defined for dynamic control of data transfer (i.e. bandwidth) by a subscriber in a communications network. The method includes receiving a data packet and retrieving a subscriber priority scheme associated with the data packet. A priority determination is then made for transmitting the packet and the packet is queued for delayed transmission.

In a further embodiment of the present invention, a device for subscriber bandwidth management is defined as including a bandwidth management module that determines if a received data packet will be delayed from further transmission in order to limit the bandwidth of the subscriber to which the data packet is associated and a queue for queuing the data packet for a delay period if the bandwidth management module determines that a delay period is necessary.

DETAILED DESCRIPTION OF THE PREFERRED EMBODIMENT

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
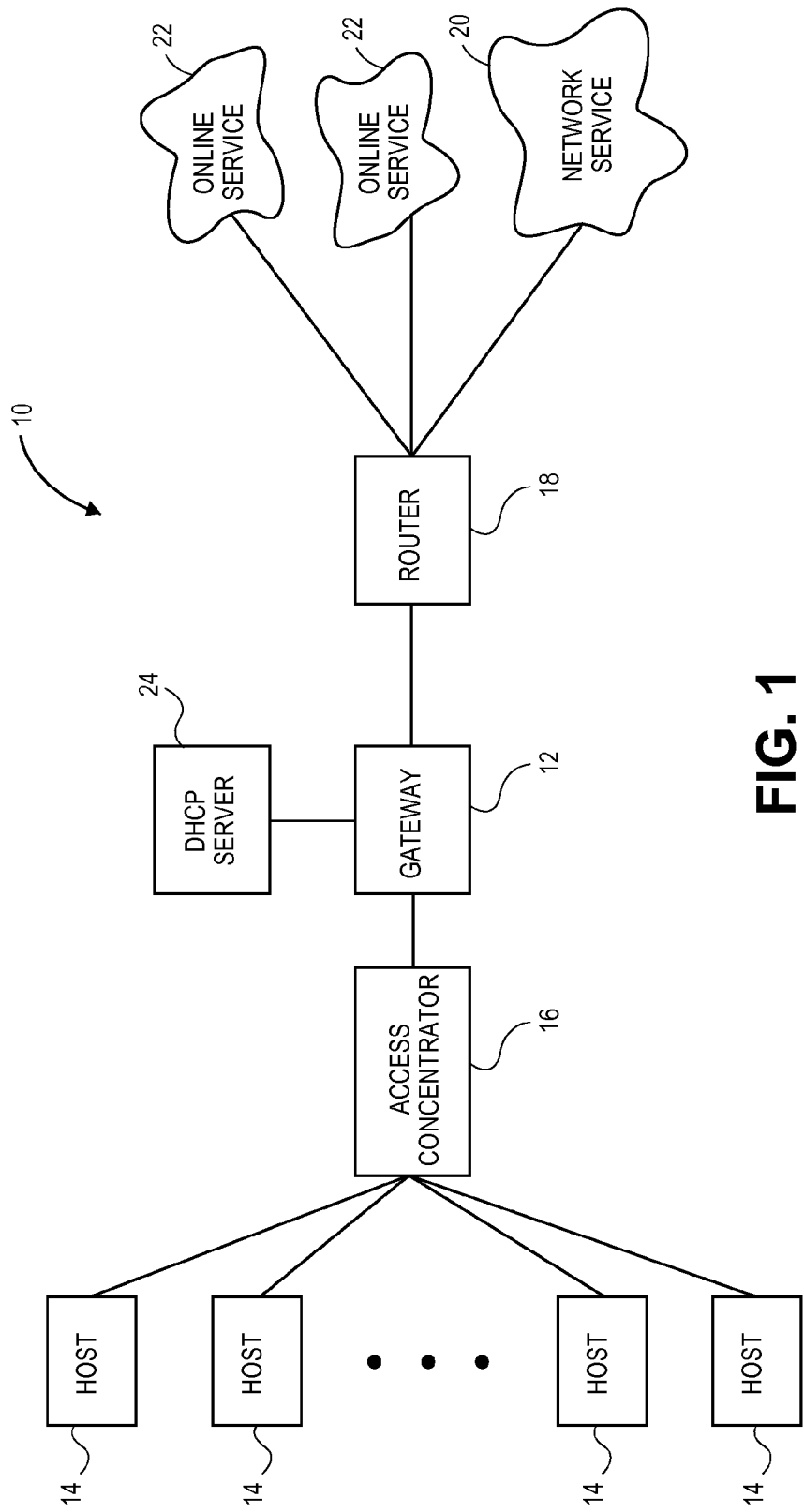
FIG. 1 is a block diagram of a communications network incorporating a gateway device in accordance with an embodiment of the present invention.

Referring now to FIG. 1, a communications network 10 that includes a gateway device 12 is depicted in block diagram form. The network system typically includes a plurality of computers/hosts 14 that access the system in order to gain access to network services or other online services. For example, the hosts can be in communication with ports that are located in different rooms of a hotel or a multi-dwelling residence. Alternatively, the hosts can be in communication with ports in an airport, an arena, or the like. The communication network also includes a gateway device that provides an interface between the plurality of hosts and the various networks or other online services. Most commonly, the gateway device is physically located proximate the hosts at a relatively low position in the structure of the overall network system. (i.e. the gateway device will be located within the hotel, multi-unit residence, airport, etc.) However, the gateway device can be located at a higher position in the overall network system such as at a Point of Presence (PoP) or a Network Operating Center (NOC), if so desired.

Although the gateway device can be physically embodied in many different fashions, the gateway device typically includes a controller and a memory device in which commands are stored that define the operational characteristics of the gateway device. Alternatively, the gateway device can be embedded within another network device, such as an access concentrator or a router, or the commands that define the functioning of the gateway device can be stored on a PCM-CIA card that can be executed by one or more hosts in order to automatically reconfigure the host(s) to communicate with a different network.

The network system 10 also typically includes an access concentrator 16 positioned between the hosts 14 and the gateway device 12 for multiplexing the signals received from the plurality of communications onto a link to the gateway device. Depending upon the medium by which the hosts are connected to the access concentrator, the access concentrator can be configured in different manners. For example, the access concentrator can be a digital subscriber line access module (DSLAM) for signals transmitted via regular telephone lines, a cable modem termination system (CMTS) for signals transmitted via coaxial cables, a wireless access point (W AP) for signals transmitted via a wireless network, a switch or the like. As also shown in FIG. 1, the communication network typically includes one or more routers 18 and/or servers (not shown in FIG. 1) in communication with a plurality of network services 20 or other online services 22. While the communication network is depicted to have a single router, the communication network will typically have a plurality of routers, switches, bridges, or the like that are arranged in some hierarchical fashion in order to appropriately route traffic to and from the various networks or other online services. In this regard, the gateway device typically establishes a link with one or more routers. The routers, in turn, establish links with the servers of other network services or other online service providers, such as Internet service providers, based upon the subscriber's selection.

The gateway device 12 is specifically designed to adapt to the configuration of, each of the hosts 14 that log onto the communication network 10 in a manner that is transparent to the subscriber and the network. In the typical communication network that employs dynamic host configuration protocol (DHCP) service, an IP address is assigned to the host that is logging onto the network through communication with the gateway device. The DHCP service can be provided by an external DHCP server 24 or it can be provided by an internal DHCP service located within the gateway device. Once a subscriber opens their web browser or otherwise attempts to access an on-line service, the gateway device will direct the subscriber to enter some form of an identifier such as their ID and password. In an alternate embodiment of the device, it is anticipated that the gateway device will be able to automatically detect this information upon connection of the host to the network or any attempt to log in. The gateway device then determines if the subscriber is entitled to access the communication system, the level of access and/or the type of services to which the subscriber is entitled according to an Authentication, Authorization and Accounting (AAA) procedure that is described by U.S. patent application Ser. Nos. 08/816,174, 09/458,602 and 09/458,569, previously incorporated by reference. An AAA service, which is a database of subscriber records, may be an AAA server remote to the gateway device or the AAA service may comprise a database incorporated into the physical embodiment housing the gateway device.

Assuming that the subscriber has been authenticated and has authorization, the gateway device typically presents subscribers with a home page or control panel that identifies, among other things, the online services or other communication networks that are accessible via the gateway device. In addition, the home page presented by the gateway device can provide information regarding the current parameters or settings that will govern the access provided to the particular subscriber. As such, the gateway administrator can readily alter the parameters or other settings in order to tailor the service according to their particular application. Typically, changes in the parameters or other settings that will potentially utilize additional resources of the network system will come at a cost, such that the gateway administrator will charge the subscriber a higher rate for their service.

The home page also permits the subscriber to select the network service 20 or other online services 22 that the subscriber wishes to access. For example, the subscriber can access the enterprise network on which the host is typically resident. Alternatively, the subscriber can access the Internet or other on-line services. Once the subscriber elects to access a network or other online service, the gateway device establishes appropriate links via one or more routers 18 to the desired network or online service.

Thereafter, the subscriber can communicate freely with the desired network 20 or other online service 22. In order to support this communication, the gateway device 12 generally performs a packet translation function that is transparent to the user/subscriber and the network. In this regard, for outbound traffic from the host 12 to the network service or other on-line service, the gateway device changes attributes within the packet coming from the user/subscriber, such as the source address, checksum, and application specific parameters, to meet the criteria of the network service to which the user/subscriber has accessed. In addition, the outgoing packet includes an attribute that will direct all incoming packets from the accessed network service to be routed through the gateway device. In contrast, the inbound traffic from the accessed network service or other online service that is routed through the gateway device, undergoes a translation function at the gateway device so that the packets are properly formatted for the user/subscriber's host. In this manner, the packet translation process that takes place at the gateway device is transparent to the host, which appears to send and receive data directly from the accessed communication network. Additional information regarding the translation function is provided by U.S. patent application Ser. No. 08/816,714. By implementing the gateway device as an interface between the user/subscriber and the communication network or other online service, however, the user/subscriber will eliminate the need to re-configure their host 12 upon accessing subsequent networks.

In accordance with the present invention, the gateway device includes a bandwidth manager that enables the user/subscribers at respective hosts to dynamically set and reset the bandwidth of their network access connection. The bandwidth manager can substantially instantaneously adjust the bandwidth available to the user/subscriber without requiring the reconfiguration or reprogramming of a hardware device(s) such as a network modem or access controller, or the restart of an existing session already in process (i.e. thereby providing session flow control). In addition, the bandwidth manager further enables the user/subscriber to independently set the upstream (uplink to the network) and downstream (downlink from the network) bandwidth. Accordingly, the user/subscriber can establish asymmetric bandwidths for upstream and downstream communications, which may be particularly useful if the user/subscriber's network activity involves a disproportionate amount of data being transferred in one direction (upstream or downstream). Depending on the bandwidth service level chosen by the user/subscriber, the user/subscriber will typically be charged an appropriate service fee. This way, the user/subscriber does not pay for bandwidth that they are not using, and only has to pay for additional bandwidth when requested. In a preferred embodiment, the user/subscriber manages their bandwidth service level via an information and control console as disclosed and described in detail in co-pending U.S. patent application Ser. No. 09/541,877, entitled "Information and Control Console for use with a Network Gateway Interface," filed on Apr. 3, 2000, in the name of inventors Short et. al., and assigned to the assignee of the present invention, the disclosure of which is herein incorporated by reference as if set forth fully herein.

In prior art network configurations bandwidth is typically modified statically by having the network administrator establish a baud rate, setting the rate in a modem and the transmitting all data packets in flow at the established baud rate. Additionally, prior art network configurations allow the link level rate to be set through the maximum burst rate or average bit rate. In this fashion, the link level rate in prior art network configurations is typically set statically or manually by a network administrator. The present invention allows for the baud rate to be set at the maximum level and then queuing (i.e. delaying) data packet transmission to simulate a perceived data rate equivalent to a data rate chosen by the subscriber. The gateway device implements the module that allows the subscriber to dynamically adjust the queuing rate of data packets. In this instance, the gateway device can adjust queuing rates on specific packet types (e.g. base queue rates on MAC addresses) and/or specific types of data traffic (e.g. vary queue rates via video traffic versus text). Subscriber profiles that are accessible to the gateway device are used to determine which data packets are to be queued, the scheduling priority assigned to queued data packets and which packets are to be transmitted without delay.

In accordance with the present invention, the gateway device implements a single queue in each transmission direction (i.e., a single queue for uplink data transmission and a single queue for downlink data transmission). These single queues are responsible for both delaying data packet transmission and prioritizing the transmission of data packets in their respective data delivery direction. In prior art networks data packet queuing is typically implemented in multiple queues; a first queue for classifying the data packets and a second queue for prioritizing the data packets. This type of queuing is processor intensive in that an evaluation of all queues for each packet must be made before a determination of which data packets should be sent based on bandwidth priority. The present invention provides for the use of a ring buffer that is less processor intensive than multiple queue methods. The single queue method of the present invention allows for all data packets in a given slot of the ring buffer to be transmitted simultaneously, thus freeing up the processor until the next tick when the next ring slot of the buffer is processed.

Figure 2:
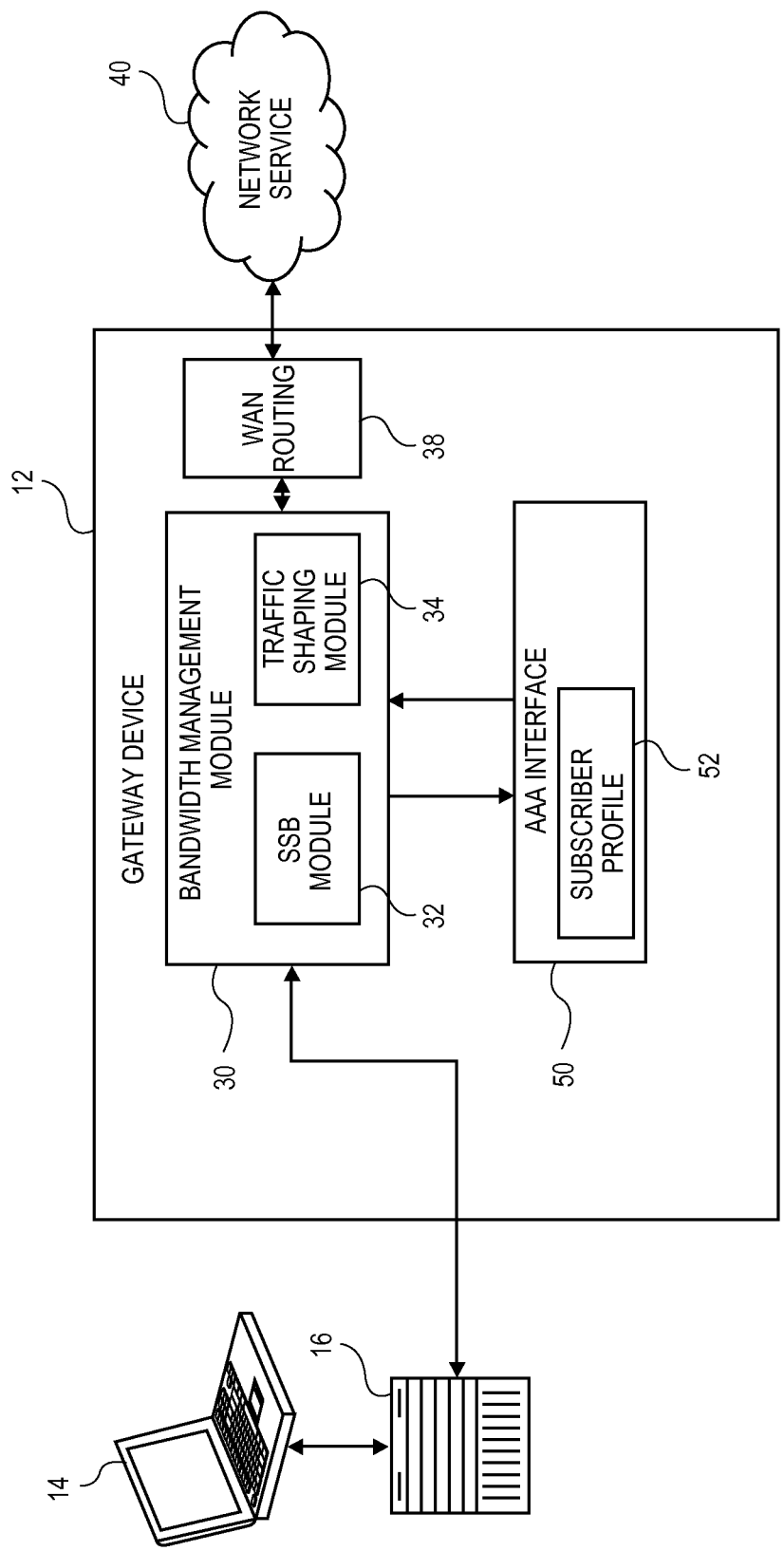
FIG. 2 is a block diagram of a communications network implementing subscriber bandwidth management within a gateway device, in accordance with an embodiment of the present invention.

With reference to FIG. 2, a block diagram of an embodiment of the gateway device 12 in accordance with the present invention is illustrated. Of particular interest with regard to the present invention is the bandwidth management module 30 (also referred to herein as the bandwidth manager). Typically, the bandwidth manager is implemented by the gateway device or the bandwidth manager can be implemented as a component of the protocol stack of the gateway device. The bandwidth manager processes the data packets (or datagram) passing through the gateway device from the user/subscriber host 14 to the network service 40 and from the network service to the user/subscriber. An intermediary device, such as access concentrator 16 is typically positioned in the network between the hosts and the gateway device. The access concentrator serves to multiplex the signals received from the plurality of hosts onto a link to the gateway device. Depending upon the medium by which the hosts are connected to the access controller, the access controller can be configured in different manners. For example, the access controller can be a digital subscriber line access module (DSLAM) for signals transmitted via regular telephone lines, a cable modem termination system (CMTS) for signals transmitted via coaxial cables, a wireless access point (WAP) for signals transmitted via a wireless network, a switch or the like.

The bandwidth manager 30 comprises a subscriber selectable bandwidth module 32 and a traffic shaping module 34, both of which are typically implemented in software. The subscriber selectable bandwidth module 32 limits the upstream and downstream bandwidths on each virtual channel through the gateway device 10 to that which the respective user/subscribers selected. The subscriber selectable bandwidth module 32 identifies the associated user/subscriber by the media access control (MAC) address or other suitable subscriber identifier within the data packet. The subscriber selectable bandwidth module 32 communicates with AAA subscriber management interface 50 to retrieve the subscriber profile 52. The subscriber profile will include the user/subscriber selected bandwidth for uplink: and downlink data transfer. The subscriber selectable bandwidth module 32 then determines whether or not to reschedule the delivery of that packet at a later point in time in order to prevent the user/subscriber from achieving a bandwidth greater than that which the user/subscriber selected.

The subscriber selectable bandwidth module 32 calculates the appropriate delay, if any, using the size (in bytes) of the current data packet, and the size and time of the previous packet delivered from the subscriber. For example, if the user/subscriber has paid for a downlink: bandwidth of 100 kilobits per second (kbps), and the gateway device 12 receives a data packet with the size of 1,500 bytes (12,000 bits), it would schedule a delay between packets of 0.12 seconds (12,000 bits in a packet/100,000 bits per second bandwidth limit).

Figure 3:
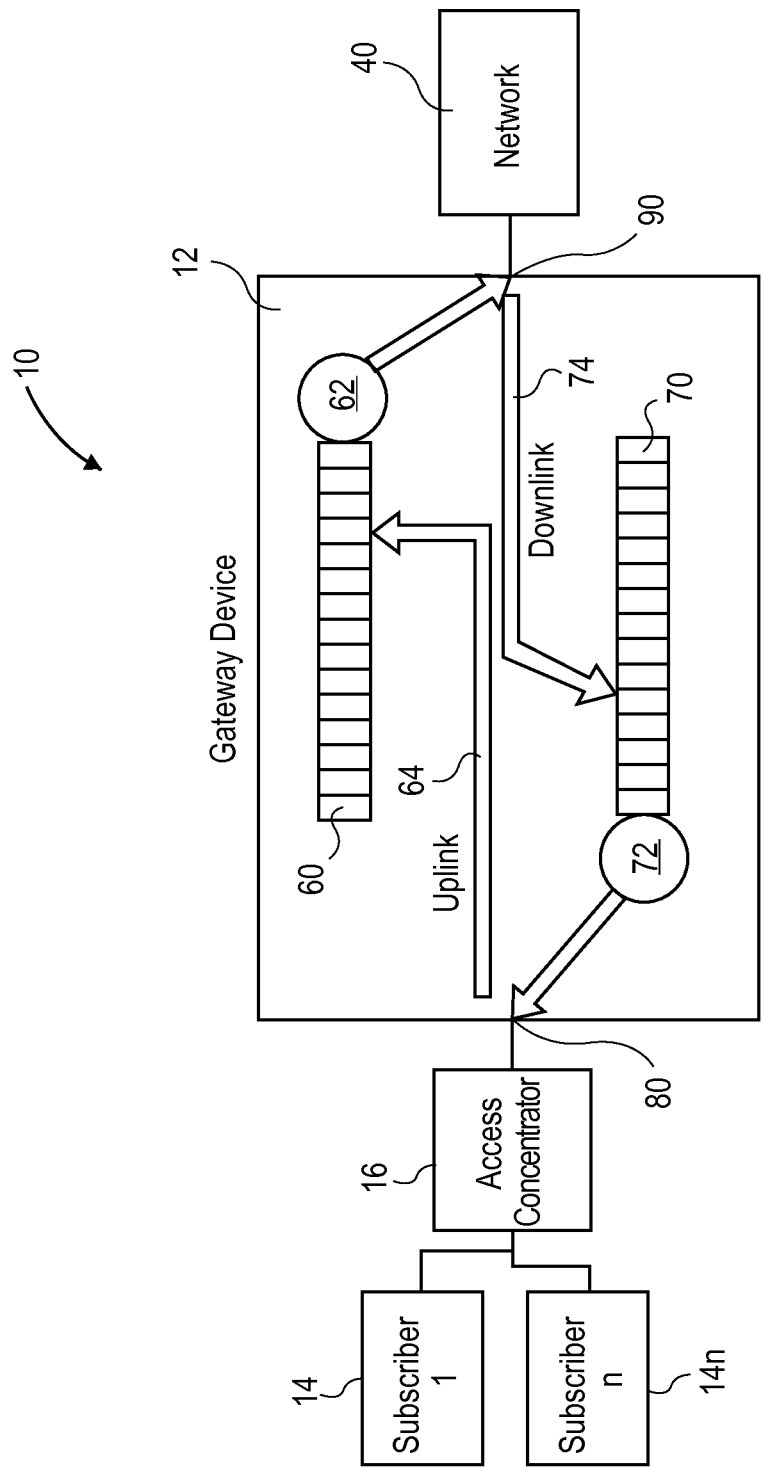
FIG. 3 is a block diagram of a communications network implementing uplink and downlink virtual queues in a gateway device, in accordance with an embodiment of the present invention.

If it is determined that the packet should be delayed, then the subscriber selectable bandwidth module 32 places the packet in memory in a virtual queue for later delivery. FIG. 3 is a block diagram illustrating the use of virtual uplink: and downlink: queues in a gateway device, in accordance with an embodiment of the present invention. The gateway device 12 will implement a virtual uplink: queue 60 and a virtual downlink: queue 70. In operation a plurality of subscriber hosts 14, 14n communicate data packets through the communication network 10. The data packets will typically be initially routed through an access concentrator 16 that serves to multiplex the data packets received from the plurality of hosts. The gateway device receives the data packets coming from the hosts at port 80 and the packets are then communicated to the uplink queue via uplink path 64.

The uplink path is implemented on a per subscriber basis where all traffic from the subscribers is placed into the uplink queue, as required. The subscriber selectable bandwidth module then determines which slot in the queue the data packet is placed in based on how much data from the subscriber is already preoccupying the queue and the degree of utilization of each slot in the queue. If a slot in the queue is full or the subscriber has already placed too much data into a slot, then the data packet will go into a subsequent slot until no more slots are available. At the point at which no more slots are available the queue will drop the packet from further processing. The uplink queue will implement an uplink ring buffer 62 that serves to add delay time to data packets that are placed in the uplink queue. Data packets that leave the ring buffer after the delay period are WAN routed to port 90 for transmission to the network service 40.

The gateway device 12 receives the data packets coming from the network service 40 at port 90 and the packets are then communicated to the downlink queue 70 via downlink path 74. The downlink path is implemented on a per subscriber basis where all traffic from the subscribers is placed into the downlink queue, as required. The subscriber selectable bandwidth module then determines which slot in the queue the data packet is placed in based on how much data from the subscriber is already preoccupying the queue and the degree of utilization of each slot in the queue. If a slot in the queue is full or the subscriber has already placed too much data into a slot, then the data packet will go into a subsequent slot until no more slots are available. At the point at which no more slots are available the queue will drop the packet from further processing. The downlink queue will implement a downlink ring buffer 72 that serves to add delay time to data packets that are placed in the downlink queue. Data packets that leave the ring buffer after the delay period are WAN routed to port 80 for transmission to the plurality of hosts 14, 14$n$.

In a preferred embodiment of the present invention, the virtual queue is implemented by a ring buffer having 120 time slots (set to equal the number of system ticks), each slot being $\frac{1}{60}^{th}$ of a second. Thus, the ring buffer can delay delivery of a packet up to two seconds. If the delay is to be more than two seconds, then the packet could be dropped or could replace an existing data packet already in the queue. Accordingly, the packet is placed in the appropriate timeslot so that the ultimate delivery of a packet will not produce a bandwidth greater than that selected and paid for by the user/subscriber. When the ring buffer pointer is pointing to the timeslot where the packet resides, the packet is transmitted out to the network or out to the user/subscriber, whichever the case may be. Each timeslot of the ring buffer is a link list of packets having a temporary relationship to the other timeslots according to the granularity of a ring buffer. While the ring buffer may have more than 120 timeslots in order to achieve greater accuracy, increasing the granularity produces increased overhead in a system.

If the user/subscriber wishes to dynamically change either their downlink or uplink bandwidths, such as via an information and control panel displayed on the host, then the new bandwidth(s) is substantially instantaneously recorded in the user/subscriber's profile. When the next packet having the MAC address of the user/subscriber is processed by the subscriber selectable bandwidth module 32, the new bandwidth is retrieved from the profile and utilized by the subscriber selectable bandwidth module 32 to determine if delivery of the packet should be delayed. Thus, the user/subscriber can dynamically change their bandwidth during an access session without requiring a reconfiguration of a component in the network. Typically, when a subscriber makes a change to the bandwidth limits it will correspond to a different billing rate. This allows the user/subscriber to cost effectively manage their network access service. It is noted that the subscriber selectable bandwidth module 32 typically does not guarantee a minimum bandwidth, but operates to limit the maximum bandwidth available to a user/subscriber according to the upstream and downstream bandwidths selected and paid for by the user/subscriber. In fact, the subscriber selectable bandwidth module 32 may operate to make the user/subscriber's network access slower than it actually would be in the absence of bandwidth management as it queues packets associated with the user/subscriber.

The traffic shaping module 34 of the bandwidth manager 30 functions to limit the number of packets transmitted on the link connecting the gateway device 12 to the network 40. In the embodiment illustrated herein, that link is a wide area network (WAN) link 38. In particular, the WAN link 38 is a communications link of finite bandwidth capable of only transmitting a certain number of packets over a given period of time. Accordingly, in order to make most efficient the operation of the WAN link 38, it is desirable to limit the packets being transmitted over the WAN link to that which the WAN link can handle without dropping packets. Accordingly, the traffic shaping module 34 uses a virtual queue in both the uplink and downlink directions that operates essentially the same as the virtual queues of the subscriber selectable bandwidth module 32, with the result of preventing the WAN link 38 from becoming overloading. By queuing the packets for a short period of time before transmitting them when the WAN link reaches its bandwidth capacity, the overall efficiency of the data transfers over the WAN link improves because the packets are not dropped and, therefore, do not need to be retransmitted. The traffic shaping module 34 monitors the traffic over the WAN link 38, and when it appears to be close (slightly above or slightly below) to the bandwidth capacity of the link, then the traffic shaping module 34 begins queuing the packets for short periods of time with the expectation that the packet volume will at some point drop so that the packet will not need to be queued for the time being. Thereby, the likelihood, or at least the number, of packets being dropped is minimized.

Another aspect of traffic management performed by the traffic shaping module 34 is the prioritization of services provided to the users/subscribers. For example, in a preferred embodiment, each user/subscriber pays for a class of service which has associated with it a maximum bandwidth. Currently, those users/subscribers which request a relatively large bandwidth compared to another user/subscriber will have its packets given priority over the packets of the other user/subscriber at the point of being transmitted over the WAN link 38. This is achieved by queuing the packets of the other user/subscribers and not those with priority. This prioritization of the packets of one user/subscriber over that of another user/subscriber can be extended to numerous other implementations. For example, a user/subscriber may purchase a class of service that places a higher prioritization upon a particular type of content, for instance, video data, audio data, etc. In such cases, the traffic shaping module 34 looks into each packet to determine the user/subscriber associated with that packet based upon the MAC address, It is also possible, and within the inventive concepts herein disclosed to have the traffic shaping module 34 look at the packet header and/or IP header to determine the content of the packet and prioritizes accordingly. Specifically, the packets including a protocol utilized to transmit audio content, for example, voiceover IP, may be given priority by the traffic shaping module 34 if the associated user/subscriber paid for such a class of service. Other protocols/parameters on which priority can be based include SMTP, EDP, TCP, a specific IP address, etc. As such the traffic shaping module can be modified to base priority on packet attributes, protocol type and/or destination port addresses.

Yet another example of the prioritization that can be performed by the traffic shaping module 34 in accordance with the present invention is the allocation of bandwidth based on a subscriber's quality of service. This type of allocation would typically guarantee a minimum level of bandwidth for the subscriber. For example, by monitoring the throughput of the gateway device 12, the traffic shaping module 34 can prioritize the packets of a specific user/subscriber who is paying for a specified percentage of the available bandwidth so that the packets of that user are transmitted at the appropriate rate so as to utilize the percentage of available bandwidth. These and other prioritization and scheduling schemes for traffic shaping are often referred to in the industry as weighted fare queuing, deficit round robin, random early detection or the like.

Figure 4A:
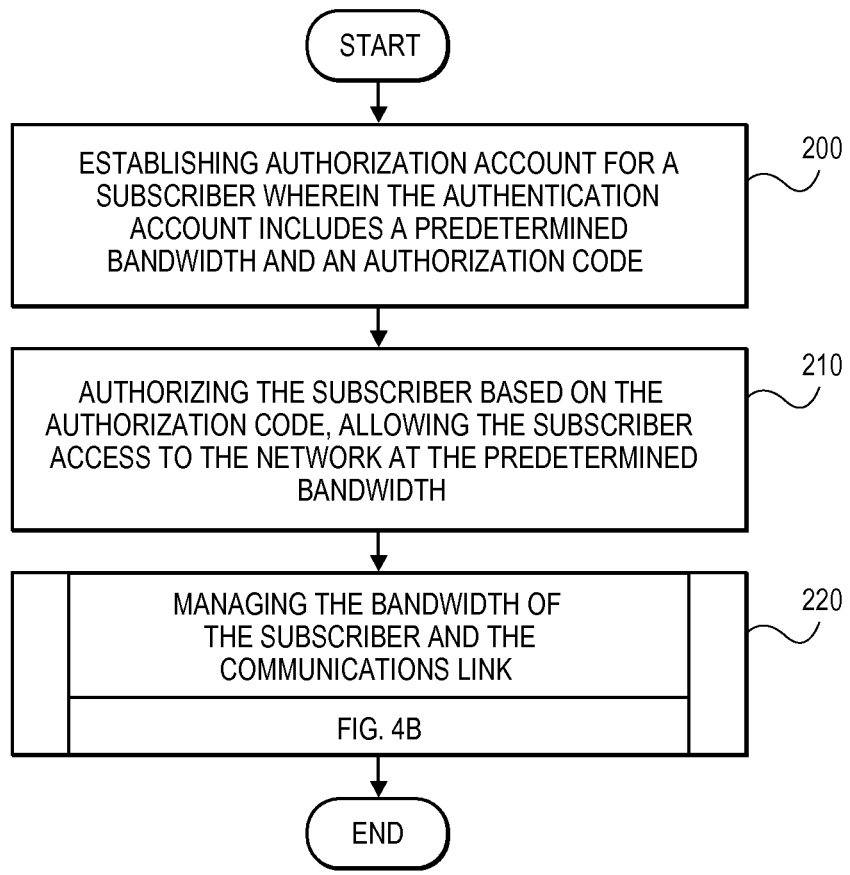
FIGS. 4A and 4B are related flowchart diagrams of a method for subscriber bandwidth management in accordance with an embodiment of the present invention.

With reference to FIG. 4A, a flow diagram of a method in accordance with an embodiment of the present invention for bandwidth management is illustrated. At block 200, a subscriber establishes an authorization account for accessing a communication network through a gateway device in accordance with the present invention. The authorization account typically includes a predetermined bandwidth value, preferably for the uplink and downlink connections, and an authorization code, such as a user name and password. At block 210, the subscriber logs into the gateway device and is authorized based on the subscriber's authorization code. This establishes network access for the subscriber through the gateway device at the predetermined bandwidth found in the authorization account. Next, at block 220, bandwidth management is performed on data packets passing through the gateway device to limit each subscriber's bandwidth to that which they have dynamically selected, and to perform traffic shaping functions, as described in greater detail with the reference to FIG. 4B. Managing the bandwidth entails receiving a request from the subscriber to dynamically adjust the predetermined bandwidth value to a second bandwidth value and adjusting the limit on the information transfer rate to the second bandwidth value. The adjustment may be for the uplink bandwidth, the downlink bandwidth or both the uplink and downlink bandwidths.

For purposes of clarity, it is noted that that the predetermined bandwidth requested by a subscriber, when establishing a network access service, typically a maximum bandwidth, represents merely a predetermined transfer rate, typically a maximum transfer rate, not necessary the actual transfer rate obtained by the user/subscriber. In fact, the user/subscriber will often find that their transfer rate is well below that of their selected rate due to network delays and congestion. Yet at other times, when the network resources are underused, the user/subscriber may obtain a transmission rate close to or at their selected transfer rate.

Figure 4B:
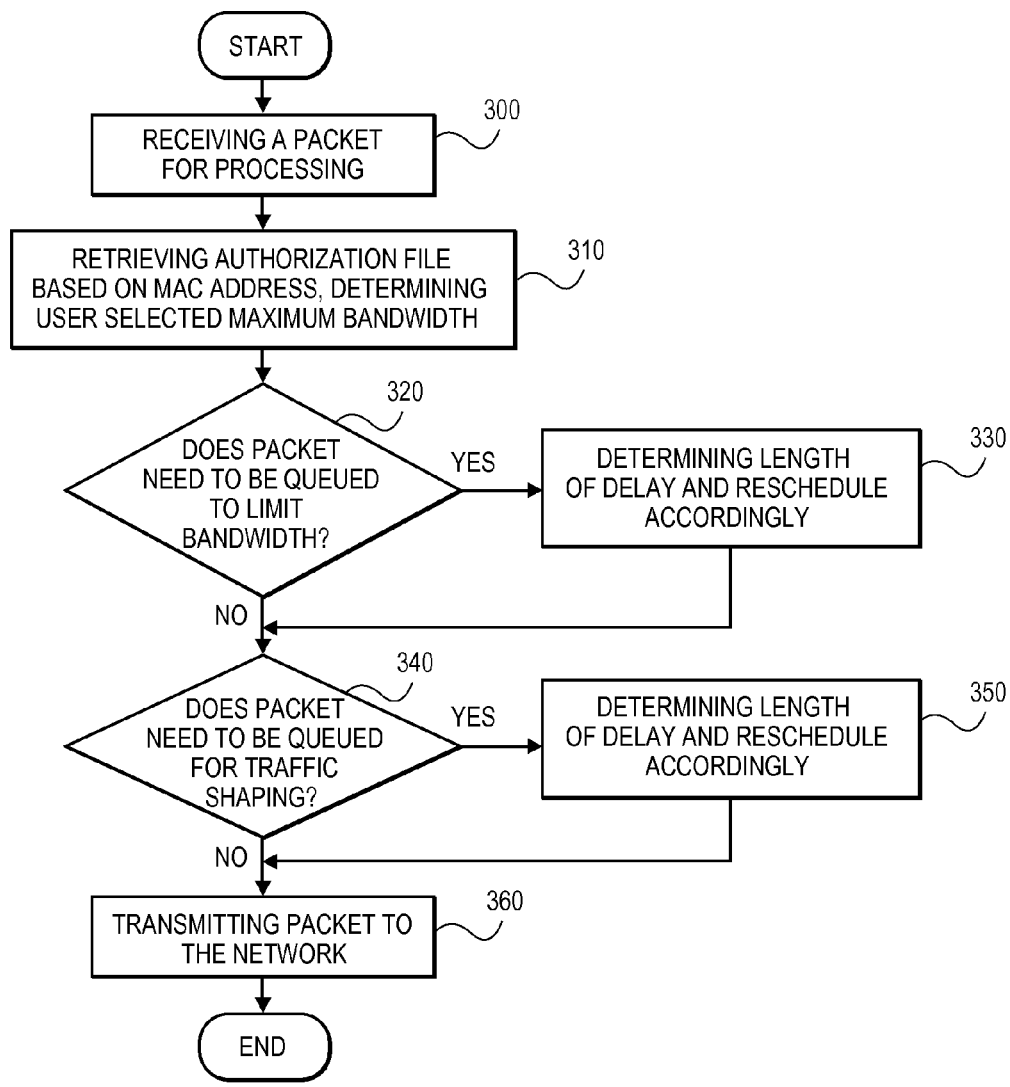

In FIG. 4B, the operation of an embodiment of the bandwidth manager on the data packets being delivered upstream to the network is provided. In particular, at block 300, a new data packet is received for processing at a gateway device or similar network interface. At block 310, the data packet is processed by extracting the MAC address from the data packet and retrieving the authorization file associated therewith, preferably from a hash table embodied with a AAA service. Based upon (a) the predetermined bandwidth chosen by the subscriber as determined from the authorization file; (b) the size of the current data packet; and/or (c) the size and time of the previous packet sent by the subscriber and processed at the bandwidth manager, it is determined if the packet needs to be queued for a period of time to ensure that the subscriber does not receive a bandwidth greater than that which the subscriber selected, as determined at decision block 320. If the packet should be delayed, then at block 330, the appropriate delay is calculated and the packet is placed in the appropriate timeslot of a ring buffer. When the pointer of the ring buffer addresses the times lot in which the packet resides, then the packet is further processed by the traffic shaping module of the bandwidth manager. In particular, at block 340, it is determined if the packet needs to be queued for traffic shaping purposes. If the packet needs to be queued, then it is determined at block 350 how long the packet should be delayed, and then the packet is placed in the appropriate timeslot of the ring buffer. When the pointer of the ring buffer addresses the timeslot where the packet resides, then the packet is transmitted over the network at block 360.

Figure 5:
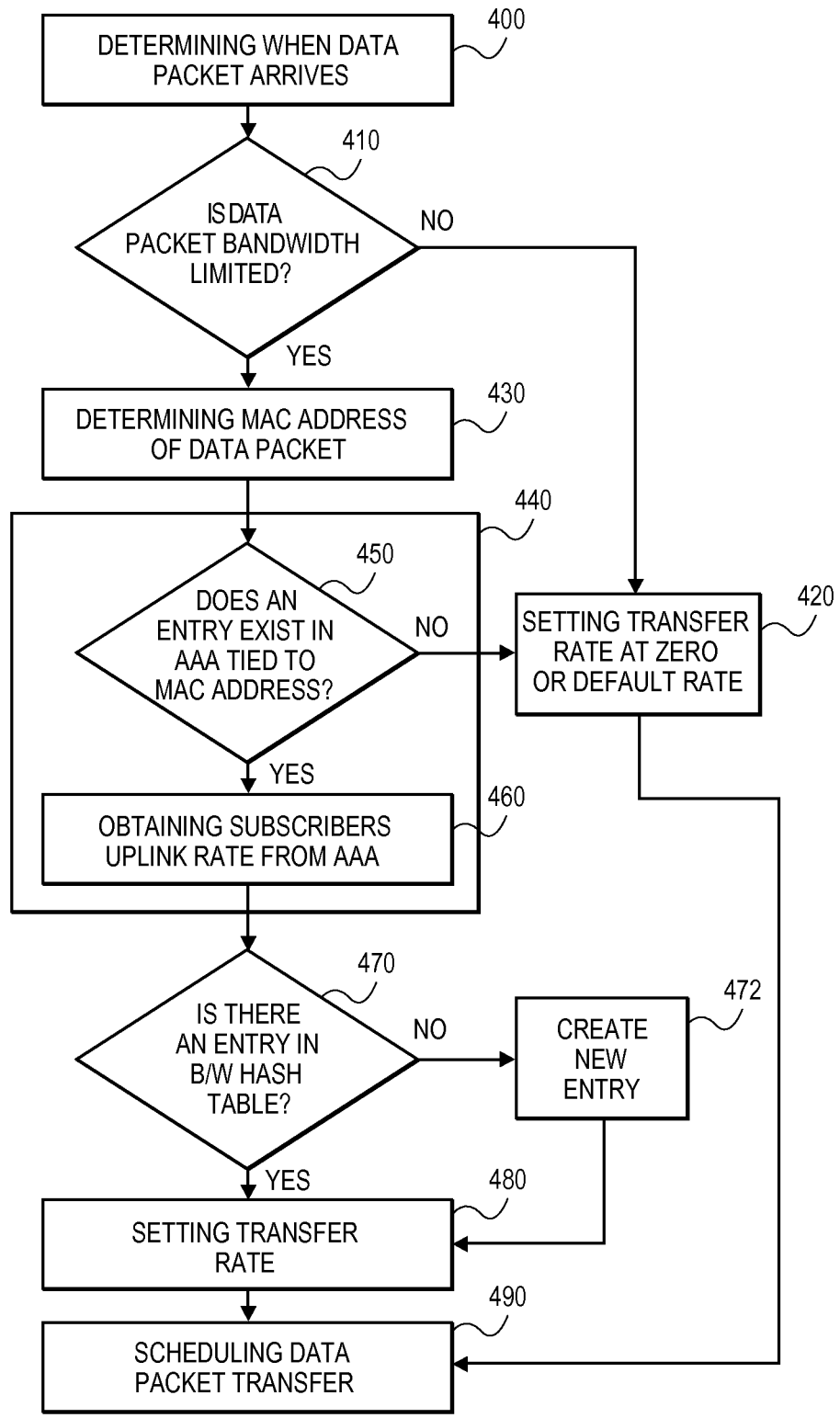
FIG. 5 is a flowchart diagram of a method for determining bandwidth for data being transmitted from host to network service, in accordance with an embodiment of the present invention.

FIG. 5 is a detailed flow diagram of the operation of the bandwidth manager in preparing data packets for transmission to an upstream network, in accordance with an embodiment of the present invention. At block 400 the time at which the data packet arrives at the gateway device is determined. The time of arrival is necessary if delay periods are to be determined and implemented for a given data packet. At block 410 the gateway device determines whether the data packet is bandwidth limited. If a determination is made that the data packet is not bandwidth limited then, at block 420, the transfer rate is set to zero so that no delay period is assigned to that data packet. If a determination is made that the data packet is bandwidth limited then, at block 430, the MAC address of the data packet is determined so that the data packet can be associated with the host from which it was sent. In this fashion, the subscriber, or more specifically the subscriber's host, can be identified.

At block 440, the gateway device accesses a database, typically an AAA service, to obtain a subscriber profile associated with the MAC address. An initial determination is made, at block 450, as to whether a profile exists in the database associated with the MAC address. If no profile is found in the database then an error message is returned to the subscriber and the default mechanism sets the transfer rate to the default rate, in accordance with block 420. If a profile is found in the database then, at block 460 the subscriber's uplink transfer rate is obtained from the profile. The gateway device then makes a determination, at block 470, as to whether there is an entry in a short term memory module that tracks the subscriber's current uplink transfer rate. In the instance where no entry currently exists, typically this entry is the first or the operation has been timed out, then, at block 472, an entry in the memory module, typically a hash table, is created. Once a determination is made that an entry already exists in the memory module or an entry is created then, at block 480, the transfer rate is set and, at block 490 the data packet is scheduled for transmission in accordance with the transfer rate that has been set.

Figure 6:
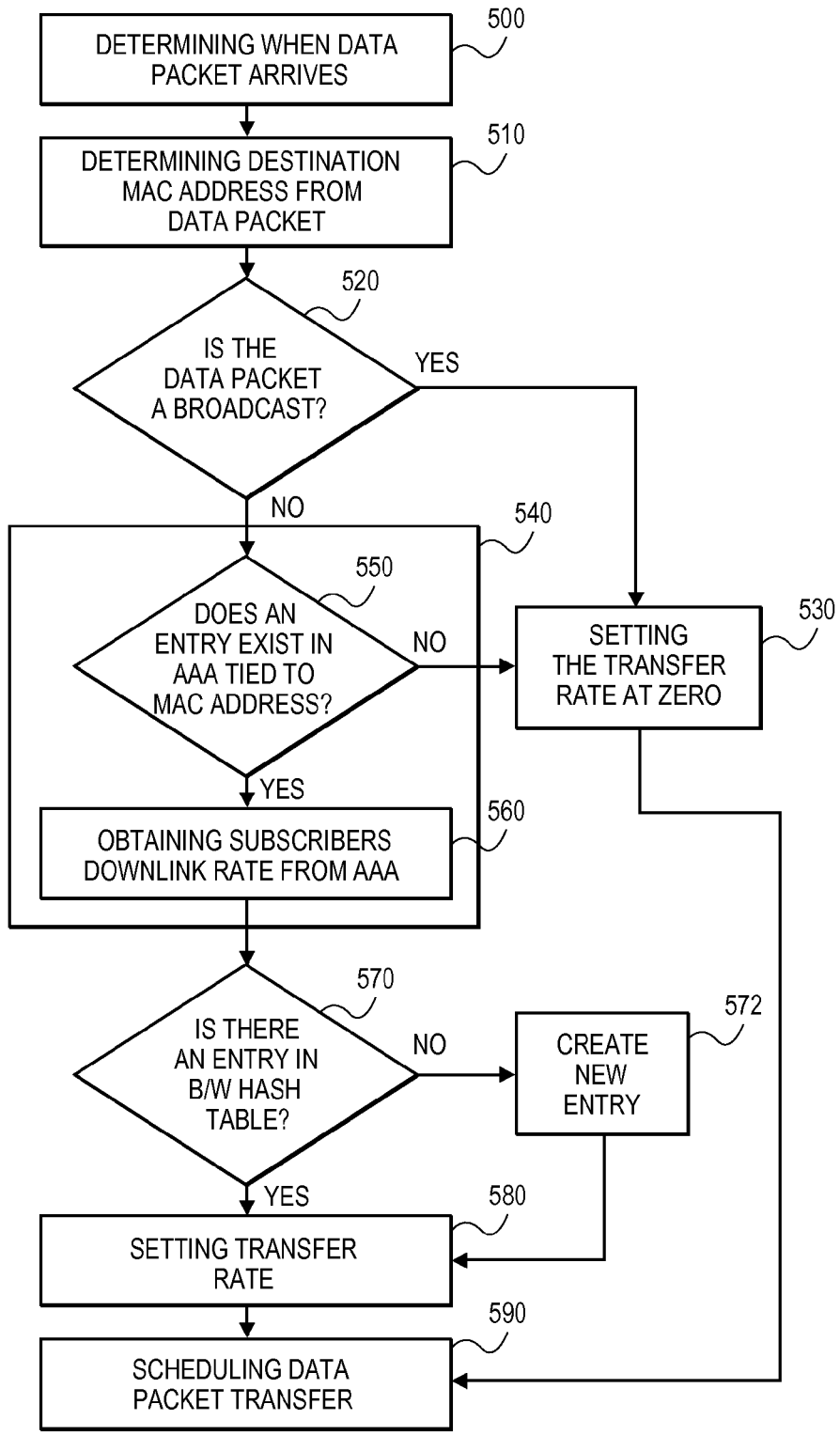
FIG. 6 is a flowchart diagram of a method for determining bandwidth for data being transmitted from a network service to a host, in accordance with an embodiment of the present invention.

FIG. 6 is a detailed flow diagram of the operation of the bandwidth manager in preparing data packets for transmission from the network to the downstream host, in accordance with an embodiment of the present invention. At block 500 the time at which the data packet arrives at the gateway device is determined. The time of arrival is necessary if delay periods are to be determined and implemented for a given data packet. At block 510, the destination MAC address of the data packet is determined so that the data packet can be associated with the host from which it will be sent to. In this fashion, the receiving subscriber, or more specifically the subscriber's host, can be identified. At block 520 the gateway device determines whether the data packet is a broadcast (i.e. audio, video or the like) data packet. If a determination is made that the data packet is a broadcast data packet then, at block 530, the transfer rate is set to zero so that no delay period is assigned to that data packet.

If a determination is made that the data packet is not a broadcast data packet then, at block 540, the gateway device accesses a database, typically an AAA service, to obtain a subscriber profile associated with the destination MAC address. An initial determination is made, at block 550, as to whether a profile exists in the database associated with the destination MAC address. If no profile is found in the database then an error message is returned to the subscriber and the default mechanism sets the transfer rate to the default rate, in accordance with block 530. If a profile is found in the database then, at block 560 the subscriber's downlink transfer rate is obtained from the profile. The gateway device then makes a determination, at block 570, as to whether there is an entry in a short term memory module that tracks the subscriber's current downlink transfer rate. In the instance where no entry currently exists, typically this entry is the first or the operation has been timed out, then, at block 572, an entry in the memory module, typically a hash table, is created. Once a determination is made that an entry already exists in the memory module or an entry is created then, at block 580, the downlink transfer rate is set and, at block 590 the data packet is scheduled for transmission in accordance with the transfer rate that has been set.

Figure 7:
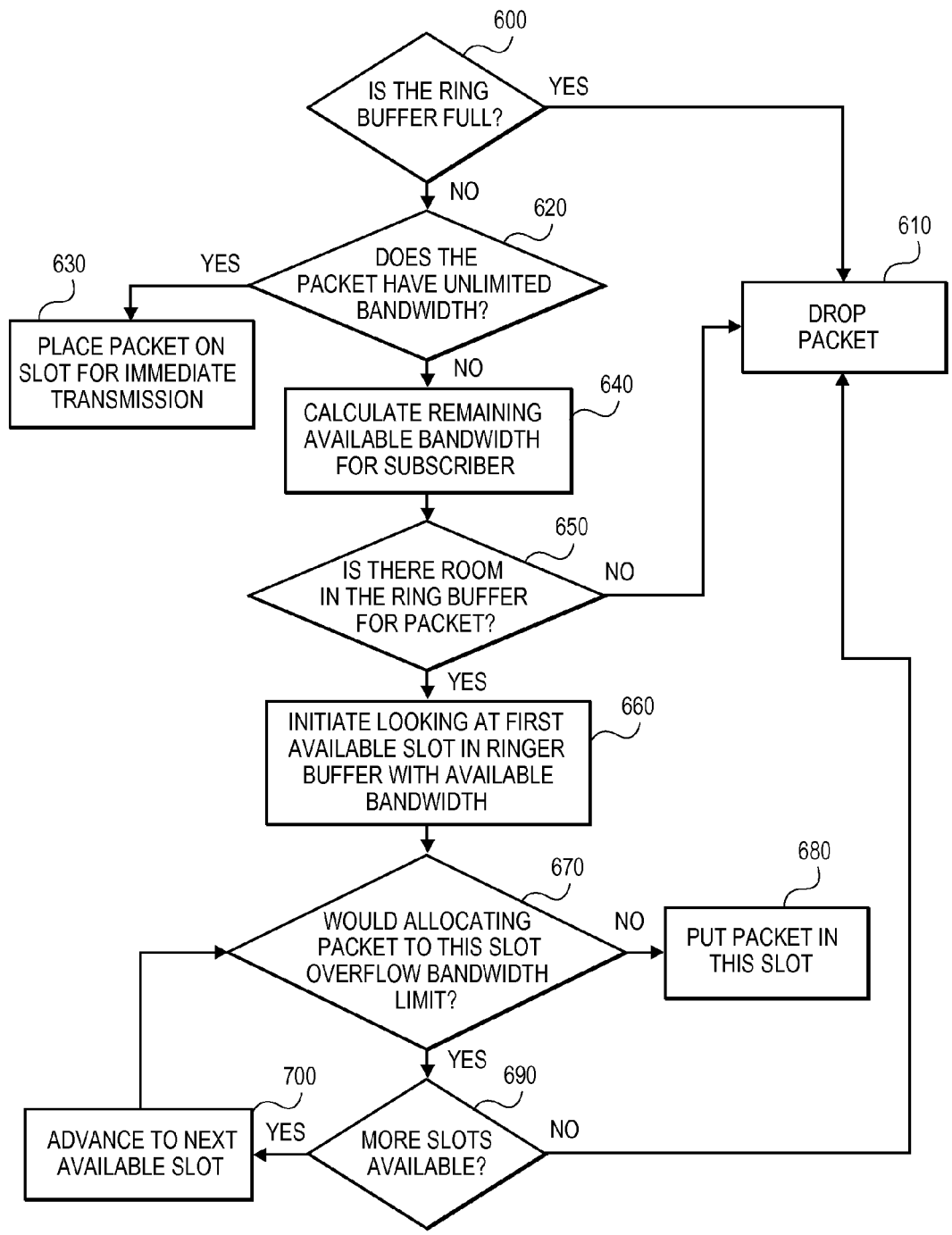
FIG. 7 is a flowchart diagram of a method for scheduling data packets for delivery, in accordance with an embodiment of the present invention.

FIG. 7 is a detailed flow diagram of the process by which data packets are queued for transmission as a means for providing bandwidth management to a subscriber in a communications network, in accordance with an embodiment of the present invention. At block 600 a determination is made whether the ring usage exceeds the maximum ring usage capacity. If the maximum ring usage capacity is exceeded (i.e. the ring is overflowed) then, at block 610, the packet is dropped and no further processing occurs. If the maximum ring usage capacity is not exceeded the, at block 620, a determination is made as to whether the packet has unlimited bandwidth. For example, media packets will typically be designated as having unlimited bandwidth. If the packet is determined to be designated as having unlimited bandwidth then, at block 630, the data packet is queued for immediate transmission by setting the slot to the current slot being transmitted. If the determination is made that the data packet is not designated for unlimited bandwidth then, at block 640, a calculation is made to quantify the difference between the bandwidth available to the subscriber and the bandwidth currently being used (i.e. the remaining available bandwidth for the subscriber).

At block 650, it is determined if there is room in the ring buffer for the data packet. If there is no room in the ring buffer then the packet is dropped at block 610. If there is room then, at block 660, the bandwidth management module initiates looking at the first available slot in the ring buffer with available bandwidth. At block 670, a determination is made as to whether allocating the data packet to ring buffer slot that is currently being looked at would overflow the bandwidth limit of that particular slot. If it does not overflow the slot then, at block 680, the data packet is inserted into the slot. If it would overflow the slot then, at block a determination is made as to whether more slots are available. If no more slots are available then, at block 610, the data packet is dropped (i.e. no further processing). If further slots are available then, at block 700, the pointer advances to the next available slot in the ring buffer. An overflow assessment is made at block 670 and the iterative process continues until the data packet is placed in a slot with sufficient available capacity or until the data packet is dropped.

The subscriber bandwidth management process and device of the present invention allows users/subscribers in a communications network to dynamically alter bandwidth limits independently in both the uplink and downlink data transmission paths. This is accomplished by providing for a single queue in the uplink transmission path and a single queue in the downlink transmission path. Thus, the user/subscriber can efficiently manage their network access according to the specific activity on the network. The network manager benefits from being able structure bandwidth allocation on a per subscriber basis so that overall data transmission is made more efficient. In addition, the bandwidth manager provides active management of the delivery of data (also known as and referred to herein as traffic shaping) to increase throughput from the gateway device onto the network.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A network connection and control system which provides network connection options to a user, the system comprising:

at least one hardware processor; and computer network communication hardware configured to provide a communication path between the at least one hardware processor and a user's network enabled device;

the at least one hardware processor configured to:

present to a user's network enabled device display content that enables the user to select one of a plurality of network connection parameters including a bandwidth parameter amongst two or more available bandwidth parameters, and dynamically set a user's selected bandwidth parameter from the two or more available bandwidth parameters;

wherein said dynamically setting the user's selected bandwidth parameter comprises delaying transmission of packets to prevent the user's network enabled device from achieving a connection speed greater than a connection speed corresponding to the user's selected bandwidth parameter.

2. The network connection and control system of claim 1, wherein the display content is a home page.

3. The network connection and control system of claim 1, wherein the display content is a control panel.

4. The network connection and control system of claim 1, wherein the bandwidth parameter can be reset by the user during a network connection.

5. The network connection and control system of claim 4, wherein resetting the bandwidth is performed substantially in real-time and without requiring hardware reconfiguration of any component in the network.

6. A method of providing a user's device with a bandwidth rate associated with a network connection, the method comprising:

presenting the user with display content on a user's device, the display content providing network connection parameter options which enables a user of the user's device to select network connection parameters associated with the user's device's connection to a network;

receiving the user's network connection parameter selection, wherein the network connection parameter selection includes an indication of a desired bandwidth amongst two or more available bandwidth to be associated with the user's device's network connection;

dynamically setting the desired bandwidth with the user's device's connection to the network, wherein said dynamically setting the desired bandwidth comprises delaying transmission of packets to prevent the user device from achieving a bandwidth greater than the corresponding user's network connection parameter selection.

7. The method of claim 6, wherein the display content is a home page.

8. The method of claim 6, wherein the display content is a control panel.

9. The method of claim 6, further comprising resetting the bandwidth rate based on an updated bandwidth parameter selection made by the user on the user's device.

10. The method of claim 9, wherein resetting the bandwidth is performed substantially in real-time and without requiring hardware reconfiguration of any component in the network.

11. The method of claim 6, wherein a bandwidth provided to the user's device is set by adjusting packet delays associated with network packets sent to the user's device.

12. A network connection and control system which provides network connection options to a user, the system comprising:

at least one hardware processor; and computer network communication hardware configured to provide a communication path between the at least one hardware processor and a user's network enabled device, said communication path having a first bandwidth parameter;

the at least one hardware processor configured to present to a user's network enabled device a portal that enables the user to change the first bandwidth parameter of the communication path to a second bandwidth parameter, said second bandwidth parameter corresponding to a higher connection speed than the first bandwidth parameter, and wherein the at least one hardware processor is configured to delay transmission of packets to prevent the user's network enabled device from achieving a connection speed greater than a connection speed corresponding to a selected bandwidth parameter.

13. The network connection and control system of claim 12, wherein the first bandwidth parameter is based on an authorization code.

14. The network connection and control system of claim 12, wherein the first bandwidth parameter is based on a predetermined bandwidth parameter associated with a user.

15. The network connection and control system of claim 12, wherein the portal is a home page.

16. The network connection and control system of claim 12, wherein the portal is a control panel.

17. The network connection and control system of claim 12, wherein the at least one hardware processor is further configured to determine a cost of network access based at least in part on the selected bandwidth parameter.

18. The network connection and control system of claim 12, wherein the at least one hardware processor is further configured to dynamically change from the first bandwidth to the second bandwidth substantially in real-time and without requiring hardware reconfiguration of any component in the network.

* * * * *